(12) United States Patent
Chen et al.

(10) Patent No.: US 11,711,721 B2
(45) Date of Patent: *Jul. 25, 2023

(54) METHOD AND APPARATUS FOR TRIGGERING UPLINK BUFFER STATUS REPORT IN A WIRELESS COMMUNICATION SYSTEM

(71) Applicant: ASUSTek Computer Inc., Taipei (TW)

(72) Inventors: I-Jen Chen, Taipei (TW); Meng-Hui Ou, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/738,344

(22) Filed: Jan. 9, 2020

(65) Prior Publication Data

US 2020/0245186 A1 Jul. 30, 2020

Related U.S. Application Data

(60) Provisional application No. 62/796,872, filed on Jan. 25, 2019, provisional application No. 62/796,856, filed on Jan. 25, 2019.

(51) Int. Cl.
*H04W 28/02* (2009.01)
*H04W 88/14* (2009.01)
*H04W 88/10* (2009.01)
*H04W 80/02* (2009.01)

(52) U.S. Cl.
CPC ....... *H04W 28/0278* (2013.01); *H04W 80/02* (2013.01); *H04W 88/10* (2013.01); *H04W 88/14* (2013.01)

(58) Field of Classification Search
CPC . H04W 28/0278; H04W 88/14; H04W 88/10; H04W 80/02; H04W 40/22; H04W 72/1252; H04W 72/1284; H04W 72/0413; H04L 67/00
See application file for complete search history.

(56) References Cited

U.S. PATENT DOCUMENTS

2012/0314672 A1* 12/2012 Chen .................. H04W 74/002
370/329
2013/0170453 A1 7/2013 Kim et al.
2016/0374110 A1* 12/2016 Lee .................... H04W 72/1247
(Continued)

FOREIGN PATENT DOCUMENTS

CN 102291771 A 12/2011
CN 106658743 A 5/2017
(Continued)

OTHER PUBLICATIONS

Notice of Submission of Opinion from Korean Intellectual Property Office in corresponding KR Application No. 10-2020-0003377, dated Mar. 24, 2021.
(Continued)

*Primary Examiner* — Abdullahi Ahmed
(74) *Attorney, Agent, or Firm* — Skaar Ulbrich Macari, P.A.

(57) ABSTRACT

Methods and devices are disclosed from the perspective of a first wireless transmit/receive unit (WTRU). In one method, the method includes triggering a first buffer status report (BSR), wherein the first BSR indicates an estimated amount of data expected to arrive.

16 Claims, 19 Drawing Sheets

(56) References Cited

U.S. PATENT DOCUMENTS

| | | | |
|---|---|---|---|
| 2018/0368166 A1* | 12/2018 | Jheng | H04W 72/1284 |
| 2020/0008218 A1* | 1/2020 | Shih | H04W 80/02 |
| 2020/0037200 A1* | 1/2020 | Cho | H04W 80/02 |
| 2020/0229115 A1* | 7/2020 | Qi | H04W 56/001 |
| 2020/0245186 A1 | 7/2020 | Chen et al. | |
| 2020/0267595 A1* | 8/2020 | Tesanovic | H04W 72/14 |
| 2021/0076404 A1* | 3/2021 | Tsai | H04W 72/14 |
| 2021/0168743 A1* | 6/2021 | Sheng | H04W 56/001 |
| 2021/0352700 A1* | 11/2021 | Lohr | H04W 28/0278 |
| 2021/0400526 A1* | 12/2021 | Wu | H04W 72/1278 |

FOREIGN PATENT DOCUMENTS

| | | |
|---|---|---|
| CN | 108990165 A | 12/2018 |
| CN | 109195117 A | 1/2019 |
| EP | 3116260 | 1/2017 |
| KR | 20110068593 A | 6/2011 |
| KR | 1020180131361 | 12/2018 |
| WO | 2020091225 | 5/2020 |

OTHER PUBLICATIONS

Mohamed Amine Kafi et al., "Congestion Control Protocols in Wireless Sensor Networks: A Survey", IEEE Communications Surveys & Tutorials, vol. 16, No. 3, Third Quarter 2014, pp. 1369-1390. Authorized licensed use limited to: Korean Intellectual Property Office (KIPO). Downloaded on Mar. 22, 2021 at 05:13:33 UTC from IEEE Xplore.

Office Action to the corresponding patent application rendered by SIPO dated Dec. 14, 2022, 8 pages.

"Pre-BSR Enabling Fast Scheduling", Huawei, 3GPP TSG-RAN WG2 Meeting 103bis R2-1815504, Oct. 8-12, 2018, 3 pages.

* cited by examiner

| Metric | Hop-by-hop RLC ARQ | End-to-end RLC ARQ |
|---|---|---|
| Forwarding latency | Potentially higher as packets have to pass through RLC-state machine on each hop. | Potentially lower as packets do not go through the RLC state machine on intermediate IAB-nodes. |
| Latency due to retransmission | Independent of number of hops | Increases with number of hops |
| Capacity | Packet loss requires retransmission only on one link. Avoids redundant retransmission of packets over links where the packet has already been successfully transmitted. | Packet loss may imply retransmission on multiple links, including those where the packet was already successfully transmitted. |
| Hop count limitation due to RLC parameters | Hop count is not affected by max window size. | Hop count may be limited by the end-to-end RLC latency due to max window size. |
| Hop count limitation due to PCDP parameters | Hop count may be limited by increasing disorder of PDCP PDUs over sequential RLC ARQ hops. This may increase probability to exceed max PDCP window size. | Hop count does not impact disorder of PDCP PDUs due to RLC ARQ. |
| Processing and memory impact on intermediate IAB-nodes | Larger since processing and memory is required on intermediate IAB-nodes. | Smaller since intermediate path-nodes do not need ARQ state machine and flow window. |
| RLC specification impact | No stage-3 impact expected | Potential stage-3 impact |
| Operational impact for IAB-node to IAB-donor upgrades | IAB-nodes and IAB-donors use the same hop-by-hop RLC ARQ. As a result, this functionality is completely unaffected by the upgrade of IAB-node to IAB-donor at availability of fiber, potentially reducing the effort required to confirm proper operation. | End-to-end RLC ARQ results in a greater architectural difference between IAB-nodes vs. IAB-donor nodes. As a result, additional effort may be required to complete an upgrade of an IAB-node to an IAB-donor upon availability of fiber. |
| Configuration complexity | RLC timers are not dependent on hop-count. | RLC timers become hop-count dependent. |
| Lossless delivery of UL data | Current specification cannot ensure data lossless delivery at certain scenarios (e.g., when IAB topology changes are performed after backhaul-link failure or when inter-CU handover happens) without additional enhancements (examples listed below). | Lossless delivery ensured due to end to end RLC feedback. |

FIG. 8 (PRIOR ART)

|  | Modification of PDCP protocol/procedures | Rerouting of PDCP PDUs buffered on intermediate IAB nodes | Introducing UL status delivery |
|---|---|---|---|
| Applicable to Rel-15 UEs | No | Yes | Yes |
| Signaling overhead | Yes<br>- New signaling for triggering data retransmission | Yes<br>- New signaling for either deciding whether to discard the buffered data or configuring the forwarding path for the buffered data on the old route. | Yes<br>- New signaling for confirming data reception and/or triggering data retransmission. |
| Support of lossless delivery of UL data | Yes | No | Yes |

FIG. 9 (PRIOR ART)

| Index | BS value | Index | BS value | Index | BS value | Index | BS value |
|---|---|---|---|---|---|---|---|
| 0 | 0 | 8 | ≤ 102 | 16 | ≤ 1446 | 24 | ≤ 20516 |
| 1 | ≤ 10 | 9 | ≤ 142 | 17 | ≤ 2014 | 25 | ≤ 28581 |
| 2 | ≤ 14 | 10 | ≤ 198 | 18 | ≤ 280 | 26 | ≤ 39818 |
| 3 | ≤ 20 | 11 | ≤ 276 | 19 | ≤ 3909 | 27 | ≤ 55474 |
| 4 | ≤ 28 | 12 | ≤ 384 | 20 | ≤ 5446 | 28 | ≤ 77284 |
| 5 | ≤ 38 | 13 | ≤ 535 | 21 | ≤ 7587 | 29 | ≤ 107669 |
| 6 | ≤ 53 | 14 | ≤ 745 | 22 | ≤ 10570 | 30 | ≤ 150000 |
| 7 | ≤ 74 | 15 | ≤ 1038 | 23 | ≤ 14726 | 31 | > 150000 |

FIG. 13 (PRIOR ART)

| Index | BS value | Index | BS value | Index | BS value | Index | BS value |
|---|---|---|---|---|---|---|---|
| 0 | 0 | 64 | ≤ 560 | 128 | ≤ 31342 | 192 | ≤ 1754595 |
| 1 | ≤ 10 | 65 | ≤ 597 | 129 | ≤ 33376 | 193 | ≤ 1868488 |
| 2 | ≤ 11 | 66 | ≤ 635 | 130 | ≤ 35543 | 194 | ≤ 1989774 |
| 3 | ≤ 12 | 67 | ≤ 677 | 131 | ≤ 37850 | 195 | ≤ 2118933 |
| 4 | ≤ 13 | 68 | ≤ 720 | 132 | ≤ 40307 | 196 | ≤ 2256475 |
| 5 | ≤ 14 | 69 | ≤ 767 | 133 | ≤ 42923 | 197 | ≤ 2402946 |
| 6 | ≤ 15 | 70 | ≤ 817 | 134 | ≤ 45709 | 198 | ≤ 2558924 |
| 7 | ≤ 16 | 71 | ≤ 870 | 135 | ≤ 48676 | 199 | ≤ 2725027 |
| 8 | ≤ 17 | 72 | ≤ 926 | 136 | ≤ 51836 | 200 | ≤ 2901912 |
| 9 | ≤ 18 | 73 | ≤ 987 | 137 | ≤ 55200 | 201 | ≤ 3090279 |
| 10 | ≤ 19 | 74 | ≤ 1051 | 138 | ≤ 58784 | 202 | ≤ 3290873 |
| 11 | ≤ 20 | 75 | ≤ 1119 | 139 | ≤ 62599 | 203 | ≤ 3504487 |
| 12 | ≤ 22 | 76 | ≤ 1191 | 140 | ≤ 66663 | 204 | ≤ 3731968 |
| 13 | ≤ 23 | 77 | ≤ 1269 | 141 | ≤ 70990 | 205 | ≤ 3974215 |
| 14 | ≤ 25 | 78 | ≤ 1351 | 142 | ≤ 75598 | 206 | ≤ 4232186 |
| 15 | ≤ 26 | 79 | ≤ 1439 | 143 | ≤ 80505 | 207 | ≤ 4506902 |
| 16 | ≤ 28 | 80 | ≤ 1532 | 144 | ≤ 85730 | 208 | ≤ 4799451 |
| 17 | ≤ 30 | 81 | ≤ 1631 | 145 | ≤ 91295 | 209 | ≤ 5110989 |
| 18 | ≤ 32 | 82 | ≤ 1737 | 146 | ≤ 97221 | 210 | ≤ 5442750 |
| 19 | ≤ 34 | 83 | ≤ 1850 | 147 | ≤ 103532 | 211 | ≤ 5796046 |
| 20 | ≤ 36 | 84 | ≤ 1970 | 148 | ≤ 110252 | 212 | ≤ 6172275 |
| 21 | ≤ 38 | 85 | ≤ 2098 | 149 | ≤ 117409 | 213 | ≤ 6572925 |
| 22 | ≤ 40 | 86 | ≤ 2234 | 150 | ≤ 125030 | 214 | ≤ 6999582 |
| 23 | ≤ 43 | 87 | ≤ 2379 | 151 | ≤ 133146 | 215 | ≤ 7453933 |
| 24 | ≤ 46 | 88 | ≤ 2533 | 152 | ≤ 141789 | 216 | ≤ 7937777 |
| 25 | ≤ 49 | 89 | ≤ 2698 | 153 | ≤ 150992 | 217 | ≤ 8453028 |
| 26 | ≤ 52 | 90 | ≤ 2873 | 154 | ≤ 160793 | 218 | ≤ 9001725 |
| 27 | ≤ 55 | 91 | ≤ 3059 | 155 | ≤ 171231 | 219 | ≤ 9586039 |
| 28 | ≤ 59 | 92 | ≤ 3258 | 156 | ≤ 182345 | 220 | ≤ 10208280 |
| 29 | ≤ 62 | 93 | ≤ 3469 | 157 | ≤ 194182 | 221 | ≤ 10870913 |
| 30 | ≤ 66 | 94 | ≤ 3694 | 158 | ≤ 206786 | 222 | ≤ 11576557 |
| ... | ... | ... | ... | ... | ... | ... | ... |

FIG. 14A (PRIOR ART)

| Index | BS value | Index | BS value | Index | BS value | Index | BS value |
|---|---|---|---|---|---|---|---|
| ... | ... | ... | ... | ... | ... | ... | ... |
| 31 | ≤ 71 | 95 | ≤ 3934 | 159 | ≤ 220209 | 223 | ≤ 12328006 |
| 32 | ≤ 75 | 96 | ≤ 4189 | 160 | ≤ 234503 | 224 | ≤ 13128233 |
| 33 | ≤ 80 | 97 | ≤ 4461 | 161 | ≤ 249725 | 225 | ≤ 13980403 |
| 34 | ≤ 85 | 98 | ≤ 4751 | 162 | ≤ 265935 | 226 | ≤ 14887889 |
| 35 | ≤ 91 | 99 | ≤ 5059 | 163 | ≤ 283197 | 227 | ≤ 15854280 |
| 36 | ≤ 97 | 100 | ≤ 5387 | 164 | ≤ 301579 | 228 | ≤ 16883401 |
| 37 | ≤ 103 | 101 | ≤ 5737 | 165 | ≤ 321155 | 229 | ≤ 17979324 |
| 38 | ≤ 110 | 102 | ≤ 6109 | 166 | ≤ 342002 | 230 | ≤ 19146385 |
| 39 | ≤ 117 | 103 | ≤ 6506 | 167 | ≤ 364202 | 231 | ≤ 20389201 |
| 40 | ≤ 124 | 104 | ≤ 6928 | 168 | ≤ 387842 | 232 | ≤ 21712690 |
| 41 | ≤ 132 | 105 | ≤ 7378 | 169 | ≤ 413018 | 233 | ≤ 23122088 |
| 42 | ≤ 141 | 106 | ≤ 7857 | 170 | ≤ 439827 | 234 | ≤ 24622972 |
| 43 | ≤ 150 | 107 | ≤ 8367 | 171 | ≤ 468377 | 235 | ≤ 26221280 |
| 44 | ≤ 160 | 108 | ≤ 8910 | 172 | ≤ 498780 | 236 | ≤ 27923336 |
| 45 | ≤ 170 | 109 | ≤ 9488 | 173 | ≤ 531156 | 237 | ≤ 29735875 |
| 46 | ≤ 181 | 110 | ≤ 10104 | 174 | ≤ 565634 | 238 | ≤ 31666069 |
| 47 | ≤ 193 | 111 | ≤ 10760 | 175 | ≤ 602350 | 239 | ≤ 33721553 |
| 48 | ≤ 205 | 112 | ≤ 11458 | 176 | ≤ 641449 | 240 | ≤ 35910462 |
| 49 | ≤ 218 | 113 | ≤ 12202 | 177 | ≤ 683087 | 241 | ≤ 38241455 |
| 50 | ≤ 233 | 114 | ≤ 12994 | 178 | ≤ 727427 | 242 | ≤ 40723756 |
| 51 | ≤ 248 | 115 | ≤ 13838 | 179 | ≤ 774645 | 243 | ≤ 43367187 |
| 52 | ≤ 264 | 116 | ≤ 14736 | 180 | ≤ 824928 | 244 | ≤ 46182206 |
| 53 | ≤ 281 | 117 | ≤ 15692 | 181 | ≤ 878475 | 245 | ≤ 49179951 |
| 54 | ≤ 299 | 118 | ≤ 16711 | 182 | ≤ 935498 | 246 | ≤ 52372284 |
| 55 | ≤ 318 | 119 | ≤ 17795 | 183 | ≤ 996222 | 247 | ≤ 55771835 |
| 56 | ≤ 339 | 120 | ≤ 18951 | 184 | ≤ 1060888 | 248 | ≤ 59392055 |
| 57 | ≤ 361 | 121 | ≤ 20181 | 185 | ≤ 1129752 | 249 | ≤ 63247269 |
| 58 | ≤ 384 | 122 | ≤ 21491 | 186 | ≤ 1203085 | 250 | ≤ 67352729 |
| 59 | ≤ 409 | 123 | ≤ 22885 | 187 | ≤ 1281179 | 251 | ≤ 71724679 |
| 60 | ≤ 436 | 124 | ≤ 24371 | 188 | ≤ 1364342 | 252 | ≤ 76380419 |
| 61 | ≤ 464 | 125 | ≤ 25953 | 189 | ≤ 1452903 | 253 | ≤ 81338368 |
| 62 | ≤ 494 | 126 | ≤ 27638 | 190 | ≤ 1547213 | 254 | > 81338368 |
| 63 | ≤ 526 | 127 | ≤ 29431 | 191 | ≤ 1647644 | 255 | Reserved |

FIG. 14B (PRIOR ART)

| Index | LCID values |
|---|---|
| 0 | CCCH |
| 1–32 | Identity of the logical channel |
| 33-46 | Reserved |
| 47 | Recommended bit rate |
| 48 | SP ZP CSI-RS Resource Set Activation/Deactivation |
| 49 | PUCCH spatial relation Activation/Deactivation |
| 50 | SP SRS Activation/Deactivation |
| 51 | SP CSI reporting on PUCCH Activation/Deactivation |
| 52 | TCI State Indication for UE-specific PDCCH |
| 53 | TCI States Activation/Deactivation for UE-specific PDSCH |
| 54 | Aperiodic CSI Trigger State Subselection |
| 55 | SP CSI-RS / CSI-IM Resource Set Activation/Deactivation |
| 56 | Duplication Activation/Deactivation |
| 57 | SCell Activation/Deactivation (four octet) |
| 58 | SCell Activation/Deactivation (one octet) |
| 59 | Long DRX Command |
| 60 | DRX Command |
| 61 | Timing Advance Command |
| 62 | UE Contention Resolution Identity |
| 63 | Padding |

FIG. 15 (PRIOR ART)

| Index | LCID values |
|---|---|
| 0 | CCCH of size 64 bits (referred to as "CCCH1" in TS 38.331 [5]) |
| 1–32 | Identity of the logical channel |
| 33–51 | Reserved |
| 52 | CCCH of size 48 bits (referred to as "CCCH" in TS 38.331 [5]) |
| 53 | Recommended bit rate query |
| 54 | Multiple Entry PHR (four octet $C_i$) |
| 55 | Configured Grant Confirmation |
| 56 | Multiple Entry PHR (one octet $C_i$) |
| 57 | Single Entry PHR |
| 58 | C-RNTI |
| 59 | Short Truncated BSR |
| 60 | Long Truncated BSR |
| 61 | Short BSR |
| 62 | Long BSR |
| 63 | Padding |

METHOD AND APPARATUS FOR TRIGGERING UPLINK BUFFER STATUS REPORT IN A WIRELESS COMMUNICATION SYSTEM

CROSS-REFERENCE TO RELATED APPLICATIONS

The present Application claims the benefit of U.S. Provisional Patent Application Serial Nos. 62/796,856 and 62/796,872 filed on Jan. 25, 2019, the entire disclosures of which are incorporated herein in their entirety by reference.

FIELD

This disclosure generally relates to wireless communication networks, and more particularly, to a method and apparatus for triggering uplink buffer status report in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

Methods and devices are disclosed from the perspective of a first wireless transmit/receive unit (WTRU). In one method, the method includes triggering a first buffer status report (BSR), wherein the first BSR indicates an estimated amount of data expected to arrive.

BRIEF DESCRIPTION OF THE DRAWINGS

FIG. 8 is a reproduction of Table 8.2.3-1 of 3GPP TR 38.874 V0.7.0.

FIG. 9 is a reproduction of Table 8.2.3-2 of 3GPP TR 38.874 V0.7.0.

FIG. 13 is a reproduction of Table 6.1.3.1-1 of 3GPP TS 38.321 V15.4.0.

FIGS. 14A and 14B are a reproduction of Table 6.1.3.1-2 of 3GPP TS 38.321.

FIG. 15 is a reproduction of Table 6.2.1-1 of 3GPP TS 38.321 V15.4.0.

FIG. 16 is a reproduction of Table 6.2.1-2 of 3GPP TS 38.321 V15.4.0.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems devices described below may be designed to support one or more standards such as the standard offered by a consortium named "3rd Generation Partnership Project" referred to herein as 3GPP, including: TS 38.300 V15.4.0, "NR and NG-RAN Overall Description; Stage 2"; TS 38.321 V15.4.0, "Medium Access Control (MAC) protocol specification"; TS 38.331 V15.4.0, "Radio Resource Control (RRC) protocol specification"; TR 38.874 V0.7.0, "Study on Integrated Access and Backhaul"; RP-172290, "New SID Proposal: Study on Integrated Access and Backhaul for NR"; RP-182882, "New WID: Integrated Access and Backhaul for NR"; and RAN2 #104 meeting minutes. The standards and documents listed above are hereby expressly incorporated by reference in their entirety.

Figure 1:
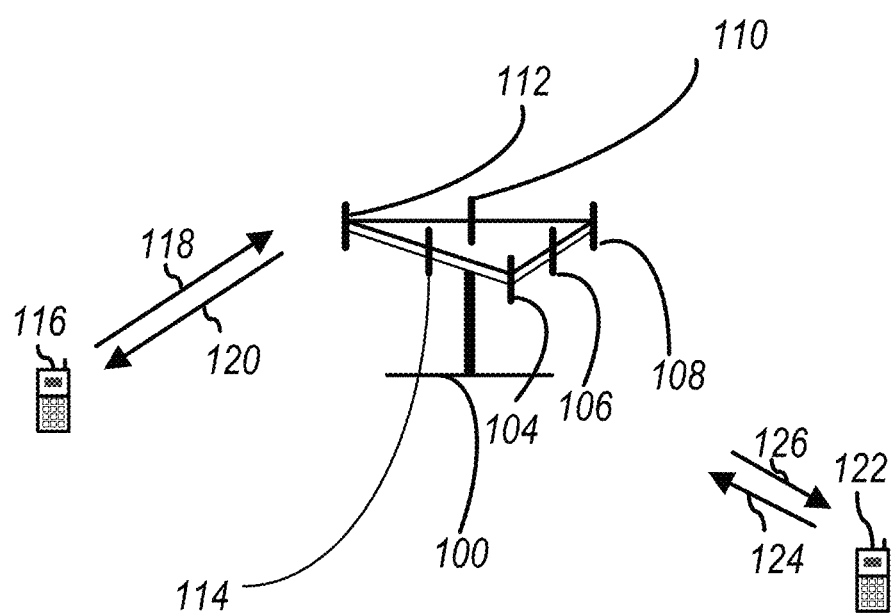
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), a network node, a network, or some other terminology. An access terminal (AT) may also be called user equipment (UE), a wireless communication device, terminal, access terminal or some other terminology.

Figure 2:
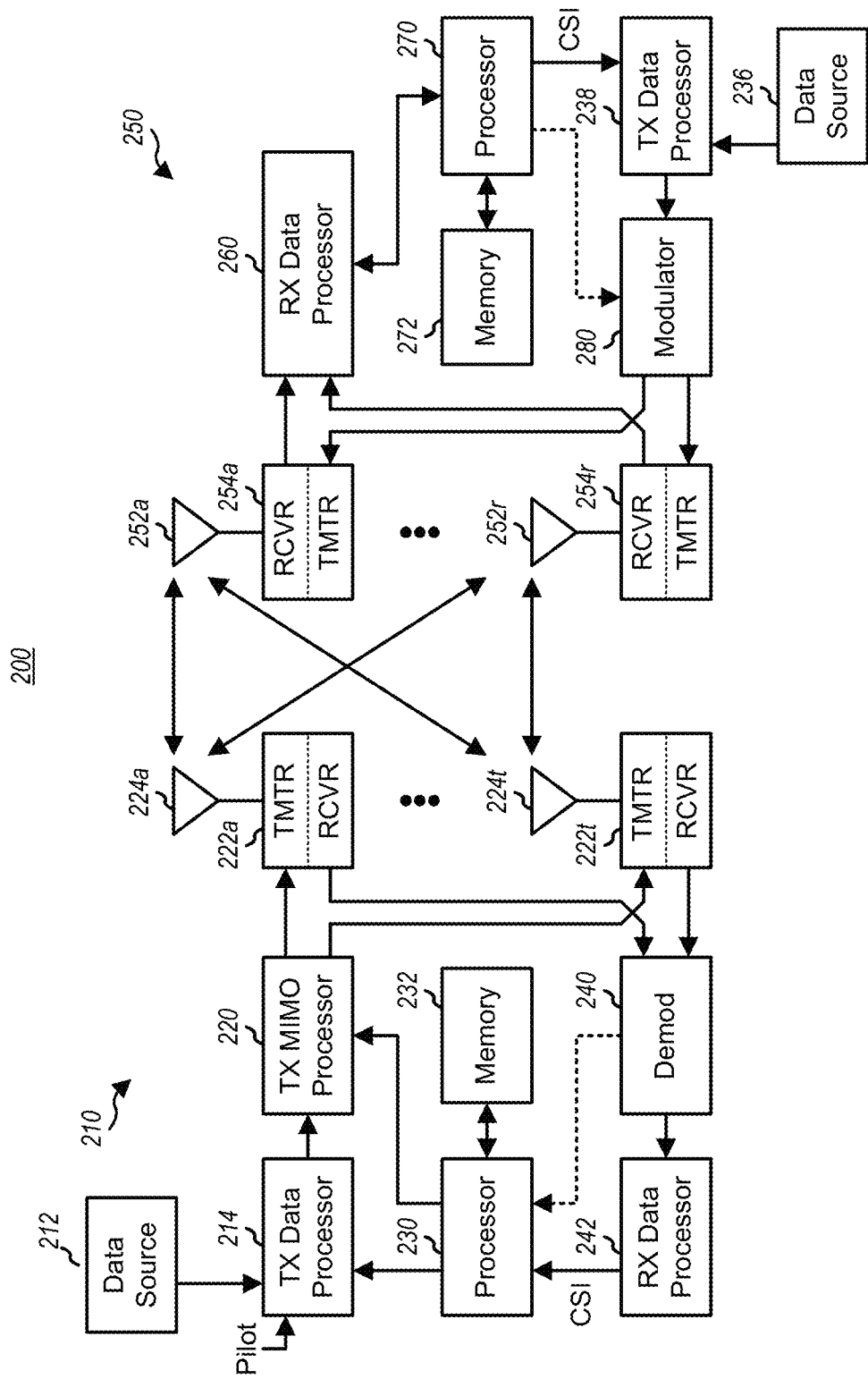
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
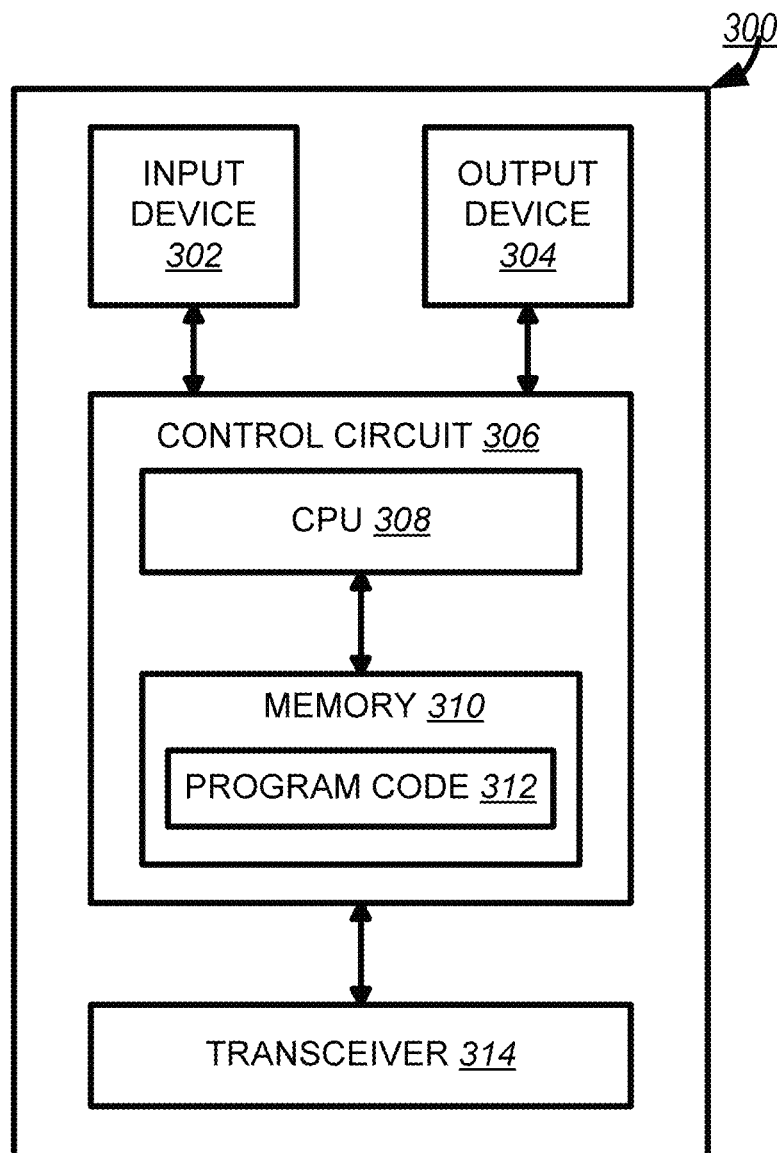
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
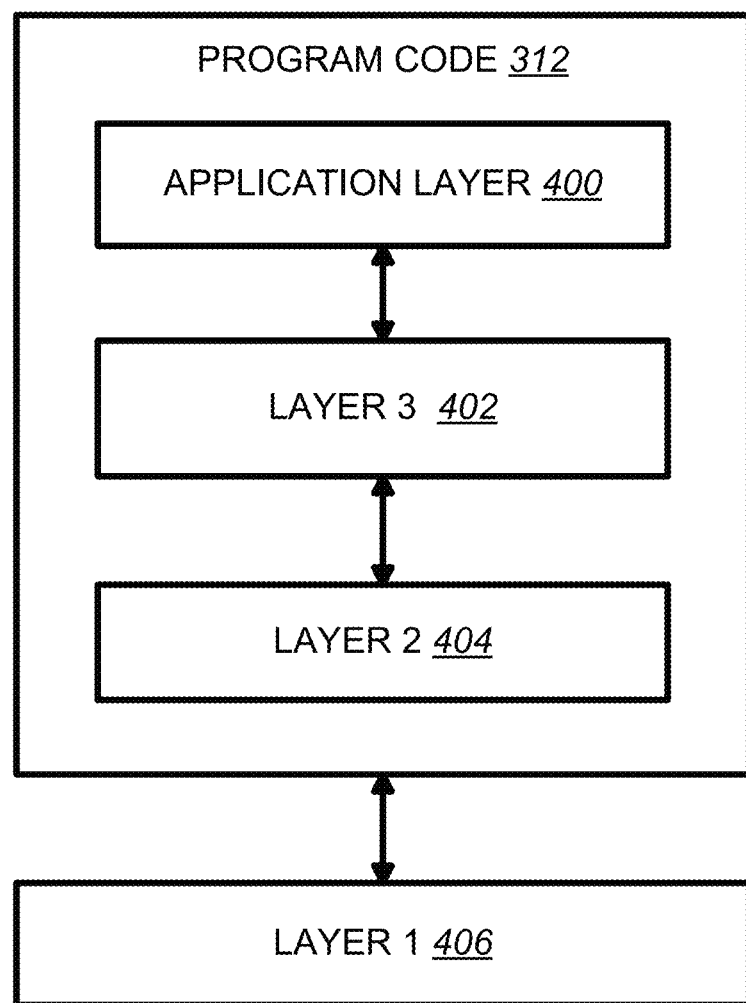
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

The study item about integrated access and backhaul (IAB) for NR is described in 3GPP RP-172290, and 3GPP TR 38.874 is the technical report (TR) for this study item. In 3GPP RP-182882, the work item about integrated access and backhaul (IAB) for NR is described for further development.

3GPP RP-182882 states:
3 Justification
One of the potential technologies targeted to enable future cellular network deployment scenarios and applications is the support for wireless backhaul and relay links enabling flexible and very dense deployment of NR cells without the need for densifying the wired transport network proportionately.

The expected larger bandwidth available for NR compared to LTE (e.g. mmWave spectrum) along with the native deployment of massive MIMO or multi-beam systems in NR creates an opportunity to develop and deploy integrated access and backhaul links. This may allow easier deployment of a dense network of self-backhauled NR cells in a more integrated manner than in LTE by building upon many of the NR control and data channels/procedures defined for providing access to UEs. An example illustration of a network with such integrated access and backhaul links is shown in FIG. 1, where relay nodes (IAB-nodes) can multiplex access and backhaul links in time, frequency, and/or space (e.g. beam-based operation).

Figure 5:
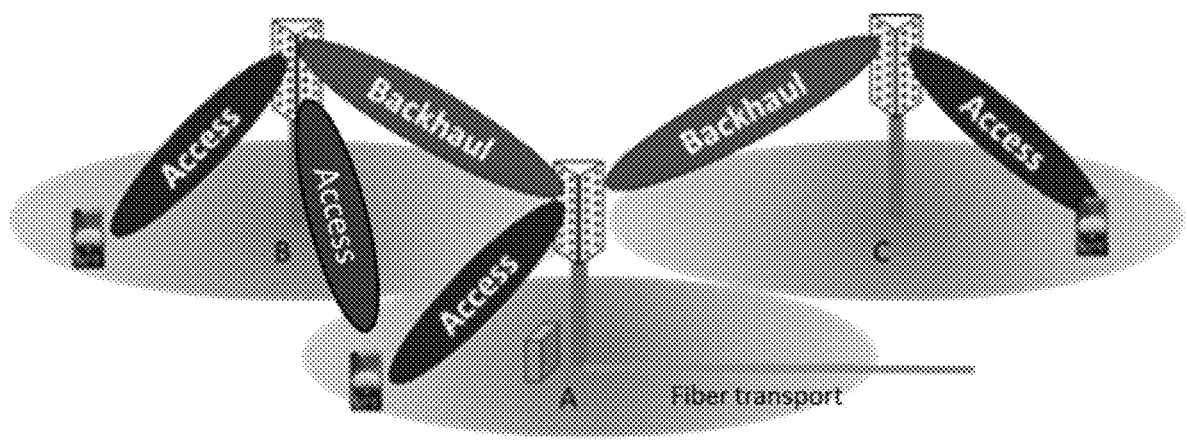
FIG. 5 is a reproduction of FIG. 1 of 3GPP RP-182882.

FIG. 1 of 3GPP RP-182882, Entitled "Integrated Access and Backhaul Links", is Reproduced as FIG. 5

The operation of access and backhaul may be on the same or different frequencies (also termed 'in-band' and 'out-of-band' relays). While efficient support of out-of-band relays is important for some NR deployment scenarios, it is critically important to support in-band operation which implies tighter interworking with the access links operating on the same frequency to accommodate duplex constraints and avoid/mitigate interference.

Due to the short range of mmWave access, extension of wireless backhauling to multiple hops is an essential feature. Such multi-hop backhauling also enhances flexibility when using self-backhauling in dense urban environments, where the backhaul path needs to adapt to the infrastructure. While the typical number of backhaul hops is expected to be small (e.g. 1-4), the architecture should not principally restrict the hop count so that larger hop count can be supported.

Further, operating NR systems in mmWave spectrum presents some unique challenges including experiencing severe short-term blocking. Overcoming short-term blocking in mmWave systems requires RAN-based mechanisms for switching between IAB-nodes with little or no involvement of the core network. The above described need to mitigate short-term blocking for NR operation in mmWave spectrum along with the desire for easier deployment of self-backhauled NR cells creates a need for the development of an integrated framework that allows fast switching of access and backhaul links.

Finally, the integrated access and backhaul system should be compliant with SA and NSA deployments in that IAB-nodes can operate in SA or NSA mode, meaning that support needs to be provided for dual connectivity (both EN-DC and NR-DC) for both UEs and IAB-nodes.

The study item 750047 "Integrated Access and Backhaul for NR" recommends an IAB architecture candidate, referred to as architecture 1a, which supports the aforementioned features (TR 38.874). The study further establishes detailed recommendations on the L2 design for integrated access and backhauling as well as enhancements to NR physical layer specifications.

IAB is very beneficial for NR rollout and during the early phases of the initial growth phase. Consequently, postponing IAB-related work to a later stage may have adverse impact on the timely deployment of NR access.

Current study status of IAB is specified in 3GPP TR 38.874 which states:
5.2.1 Multi-Hop Backhauling
Multi-hop backhauling provides more range extension than single hop. This is especially beneficial for above-6 GHz frequencies due to their limited range. Multi-hop backhauling further enables backhauling around obstacles, e.g. buildings in urban environment for in-clutter deployments.

The maximum number of hops in a deployment is expected to depend on many factors such as frequency, cell density, propagation environment, and traffic load. These factors are further expected to change over time. From the architecture perspective, flexibility in hop count is therefore desirable. With increasing number of hops, scalability issues may arise and limit performance or increase signaling load to unacceptable levels. Capturing scalability to hop count as a KPI is therefore an important aspect of the study.

Requirements: IAB design shall support multiple backhaul hops
   The architecture should not impose limits on the number of backhaul hops.
   The study should consider scalability to hop-count an important KPI.
   Single hop should be considered a special case of multiple backhaul hops.

5.2.2 Topology Adaptation
Wireless backhaul links are vulnerable to blockage, e.g., due to moving objects such as vehicles, due to seasonal changes (foliage), or due to infrastructure changes (new buildings). Such vulnerability also applies to physically stationary IAB-nodes. Also, traffic variations can create uneven load distribution on wireless backhaul links leading to local link or node congestion.

Topology adaptation refers to procedures that autonomously reconfigure the backhaul network under circumstances such as blockage or local congestion without discontinuing services for UEs.

Requirement: Topology adaptation for physically fixed relays shall be supported to enable robust operation, e.g., mitigate blockage and load variation on backhaul links 5.2.6 Network Synchronization
Time synchronization between IAB-nodes is also very essential e.g. to support TDD system and some potential features which need network synchronization. IAB may have additional requirement on network synchronization, which includes in-band wireless backhaul and multi-hops backhauling.

6.1.1 Functions and Interfaces for IAB

Figure 6:
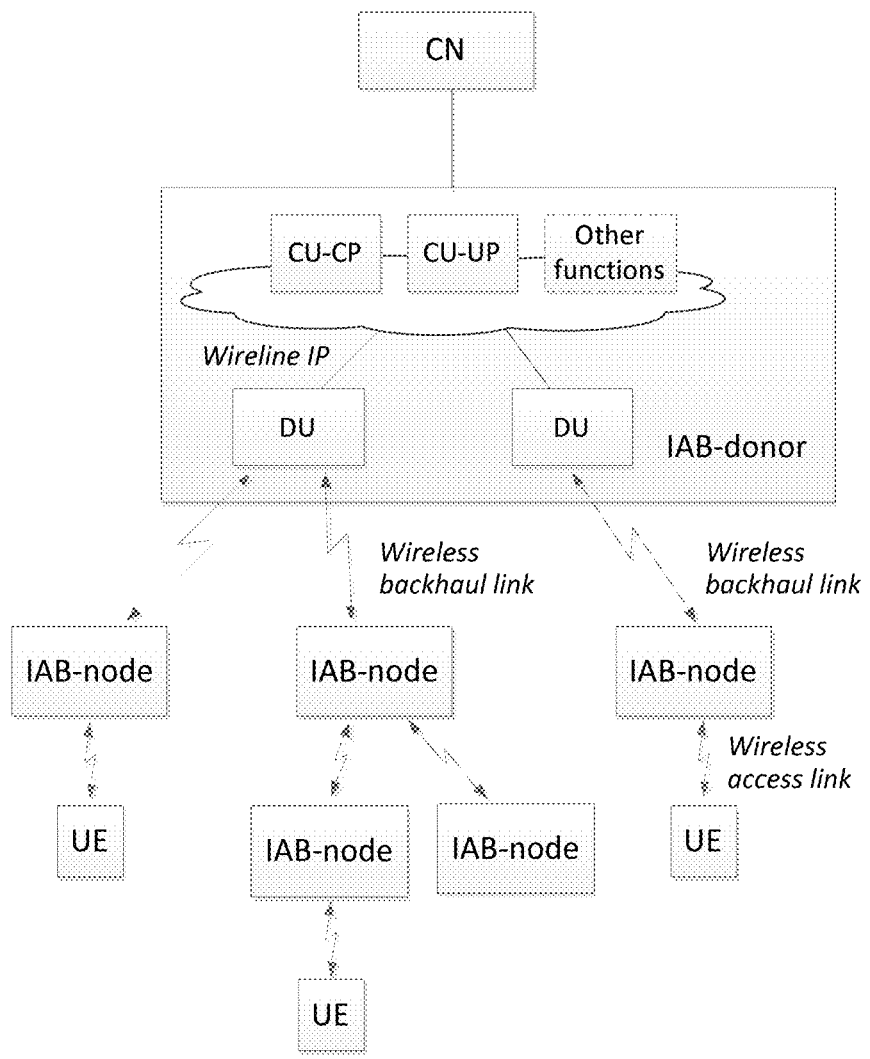
FIG. 6 is a reproduction of FIG. 6.1.1-1 of 3GPP 38.874 V0.7.0.

FIG. 6.1.1-1 of 3GPP 38.874 V0.7.0, Entitled "Reference Diagram for IAB-Architectures (SA Mode)", is Reproduced as FIG. 6

IAB strives to reuse existing functions and interfaces defined for access. In particular, Mobile-Termination (MT), gNB-DU, gNB-CU, UPF, AMF and SMF as well as the corresponding interfaces NR Uu (between MT and gNB), F1, NG, X2 and N4 are used as baseline for the IAB architectures. Modifications or enhancements to these functions and interfaces for the support of IAB will be explained in the context of the architecture discussion. Additional functionality such as multi-hop forwarding is included in the architecture discussion as it is necessary for the understanding of IAB operation and since certain aspects may require standardization.

The Mobile-Termination (MT) function has been defined a component of the Mobile Equipment. In the context of this study, MT is referred to as a function residing on an IAB-node that terminates the radio interface layers of the backhaul Uu interface toward the IAB-donor or other IAB-nodes.

FIG. 6.1.1-1 shows a reference diagram for IAB in stand-alone mode, which contains one IAB-donor and multiple IAB-nodes. The IAB-donor is treated as a single logical node that comprises a set of functions such as gNB-DU, gNB-CU-CP, gNB-CU-UP and potentially other functions. In a deployment, the IAB-donor can be split according to these functions, which can all be either collocated or non-collocated as allowed by 3GPP NG-RAN architecture. IAB-related aspects may arise when such split is exercised. Also, some of the functions presently associated with the IAB-donor may eventually be moved outside of the donor in case it becomes evident that they do not perform IAB-specific tasks.

7.2.1 IAB-Node Initial Access (Stage 1)

In case of SA deployments, initial IAB-node discovery by the MT (Stage 1) follows the same Rel-15 initial access procedure as an UE, including cell search based on the same SSBs available for access UEs, SI acquisition, and random access, in order to initially set up a connection to a parent IAB-node or a IAB-donor.

In case of an NSA deployment (from an access UE perspective), when the IAB-node MT performs initial access on the NR carrier, it follows the same Stage 1 initial access as in SA deployments (from an access UE perspective). The SSB/RMSI periodicity assumed by the MTs for initial access may be longer than 20 ms assumed by Rel-15 UEs, and a single value is to be selected from the following candidate values: 20 ms, 40 ms, 80 ms, 160 ms.

NOTE: This implies that the candidate parent IAB-nodes/donors must support both NSA functionality for the UE and SA functionality for the MT on the NR carrier.

When IAB-node MT performs initial access on a LTE carrier, Stage 2 solutions can be used for IAB-node parent selection by the MT on the NR carrier.

7.2.2 Inter-IAB Node Discovery and Measurement (Stage 2)

For the purpose of backhaul link RSRP/RSRQ RRM measurements IAB supports both SSB-based and CSI-RS based solutions.

For the purpose of inter-IAB node and donor detection after the IAB node DU becomes active (Stage 2), the inter IAB-node discovery procedure needs to take into account the half-duplex constraint at an IAB node and multi-hop topologies. The following three solutions are supported:

SSB-Based Solutions (Solution 1-A and 1-B):

Solution 1-A) Reusing the same set of SSBs used for access UEs

In this case, the SSBs for inter-IAB cell search in stage 2 are on the currently defined sync raster for a SA frequency layer, while for a NSA frequency layer the SSBs are transmitted inside of the SMTC configured for access UEs.

Solution 1-B) Use of SSBs which are orthogonal (TDM and/or FDM) with SSBs used for access UEs In this case, the SSBs, that may get muted, for inter-IAB cell search and measurement in stage 2 are not on the currently defined sync raster for a SA frequency layer, while for a NSA frequency layer the SSBs are transmitted outside of the SMTC configured for access UEs.

An IAB node should not mute its own SSB transmissions targeting UE cell search and measurement when doing inter-IAB cell search in stage 2

For SA, this means that SSBs transmitted on the currently defined sync raster follow the currently defined periodicity for initial access.

In case of Solution 1-B, this implies SSBs, that may get muted, for inter-IAB stage 2 cell search is at least TDM with SSBs used for UE cell search and measurements.

CSI-RS Based Solutions (Solution 2):

CSI-RS can be used for inter-IAB detection in synchronous network

To support IAB-node initial access and Stage 2 inter-IAB-node discovery and measurement, enhancements to existing Rel.15 SMTC/CSI-RS/RACH configurations and RMSI may need to be supported as well as coordination across IAB-nodes.

7.2.3 IAB-Node RACH

IAB supports the ability of network flexibility to configure backhaul RACH resources with different occasions, longer RACH periodicities, and additional preamble formats allowing for longer RTT, compared to access RACH resources without impacting Rel-15 UEs.

Based on Rel-15 PRACH configurations, the network is allowed to configure offset(s) for PRACH occasions for the MT of IAB node(s), in order to TDM backhaul RACH resources across adjacent hops.

7.2.4 Backhaul Link Management

An IAB-node supports mechanisms for detecting/recovering from backhaul link failure based on Rel-15 mechanisms. Enhancements to Beam Failure Recovery and Radio Link Failure procedures are beneficial and should be supported for NR IAB, including:

Enhancements to support interaction between Beam Failure Recovery success indication and RLF;

Enhancements to existing beam management procedures for faster beam switching/coordination/recovery to avoid backhaul link outages should be considered for IAB-nodes.

In addition, the need for additional backhaul link condition notification mechanism (E.g., if the parent IAB-node's backhaul link fails) from the parent IAB-node DU to the child IAB-node as well as corresponding IAB-node behaviour were studied. Solutions to avoid RLF at a child IAB-node due to parent backhaul link failure should be supported.

7.3.1 Scheduling of Backhaul and Access Links

Figure 7:
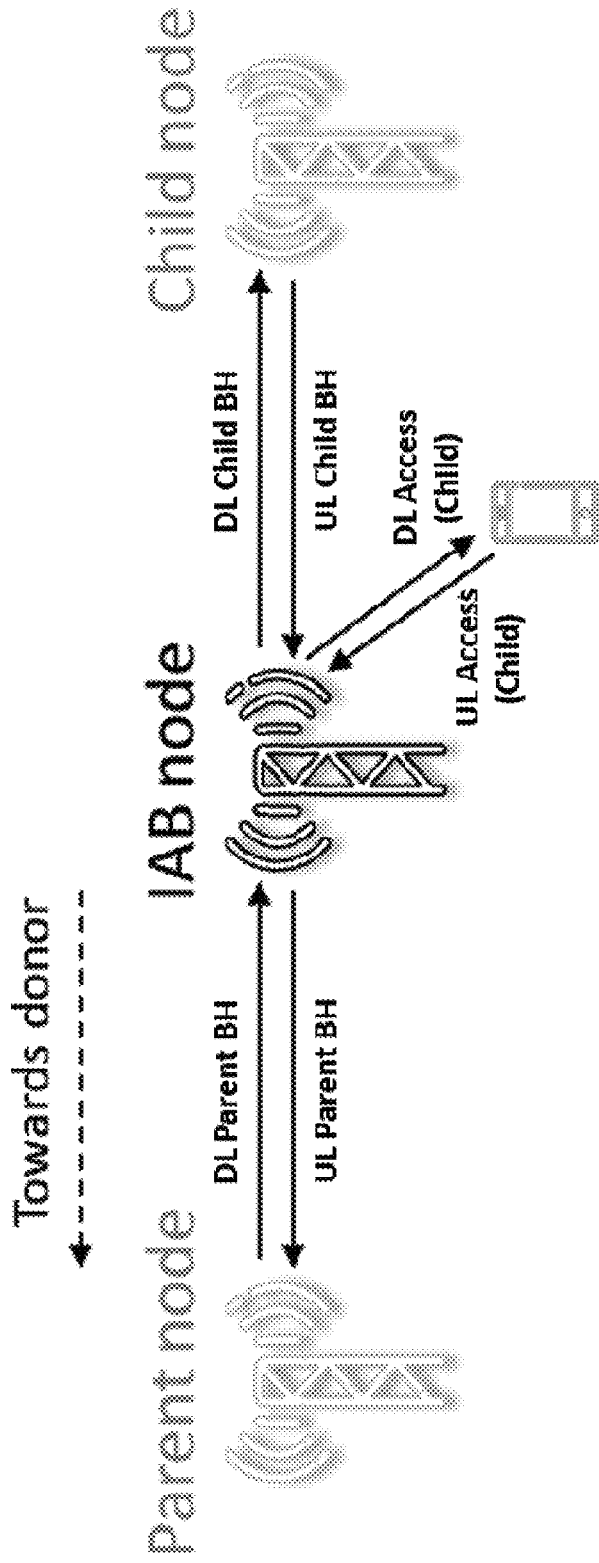
FIG. 7 is a reproduction of FIG. 7.3.1-1 of 3GPP TR 38.874 V0.7.0.

As shown in FIG. 7.3.1-1, the following link types are supported for IAB:

Access link: a link between an access UE and an IAB-node or IAB-donor ($L_{A,DL}$ or $L_{A,UL}$);

Backhaul link: a link between an IAB-node and an IAB child node ($L_{C,DL}$ or $L_{C,UL}$) or an IAB parent node ($L_{P,DL}$ or $L_{P,UL}$).

FIG. 7.3.1-1 of 3GPP TR 38.874 V0.7.0, Entitled "Different IAB Link Types", is Reproduced as FIG. 7

Note that depending on the topology/architectures considered in Section 6 and 9 respectively, the IAB-node may have its functions for UL access and child BH respectively in the same location or different locations, and for a given BH link for an IAB-node, it may be a parent BH or a child BH, depending on the topology/architecture.

Downlink IAB node transmissions (i.e. transmissions on backhaul links from an IAB-node to child IAB-nodes served by the IAB-node and transmissions on access links from an IAB-node to UEs served by the IAB-node) should be scheduled by the IAB-node itself. Uplink IAB transmission (transmissions on a backhaul link from an IAB-node to its parent IAB-node or IAB-donor) should be scheduled by the parent IAB-node or IAB-donor.

Table 8.2.3-1 of 3GPP TR 38.874 V0.7.0, Entitled "Observations for End-to-End and Hop-by-Hop ARQ", is Reproduced as FIG. 8

Table 8.2.3-2 of 3GPP TR 38.874 V0.7.0, Entitled "Comparison of Mechanisms for Lossless Delivery of UL Data in Hop-by-Hop RLC ARQ Case", is Reproduced as FIG. 9

8.6 Latency in UL Scheduling

Increased latency due to multiple hops in an IAB network can adversely impact the performance of both control plane procedures (such as handover and radio link recovery) and also user plane data transmission. In order to achieve hop agnostic performance in IAB scheduling, it is important to reduce the E2E delay from the UE to the IAB-donor, and meet the latency requirement, regardless of how many hops the UE is away from the IAB-donor.

In multi-hop networks, upstream data arriving from a child node may suffer scheduling delays at the parent node and intermediate nodes. To some extent, this is no different from a single-hop UE where new data arrives into UE buffers after a BSR is sent. However, in a multi-hop network, the delays are likely to accumulate due to number of hops and aggregated volume of data at IAB-nodes and may require mitigation mechanisms. Request of uplink resources at each hop and UL data transmission are shown in FIGS. 8.6-1.

FIGS. 8.6-1 of 3GPP TR 38.874 V0.7.0, Entitled "Uplink Delays in IAB Network: Worst Case Scenario, where None of the Intermediate Nodes have any UL Resources Allocated to Them", is Reproduced FIG. 10

It is clear that this process can be significantly longer than the corresponding process in one-hop networks, due to the multiple consecutive uplink resource request and allocation steps. The underlying reason for these delays is that the MT part of an IAB-node can only request uplink resources for the UL data transmission after it actually receives the data to be transmitted.

One approach to mitigate such delays consists of initiating an uplink resource request at an IAB-node based on data that is expected to arrive. This would enable the IAB-node to obtain the uplink resource prior to actual data reception from its child IAB-node or a UE that it serves.

The details of the content and triggers of the SR/BSR and UL scheduling are left for the WI phase.

In NR, the procedures related to SR/BSR are specified in 3GPP TS 38.321 (as provided below) as a starting point for further enhancement.

5.4.4 Scheduling Request

The Scheduling Request (SR) is used for requesting UL-SCH resources for new transmission.

The MAC entity may be configured with zero, one, or more SR configurations. An SR configuration consists of a set of PUCCH resources for SR across different BWPs and cells. For a logical channel, at most one PUCCH resource for SR is configured per BWP.

Each SR configuration corresponds to one or more logical channels. Each logical channel may be mapped to zero or one SR configuration, which is configured by RRC. The SR configuration of the logical channel that triggered the BSR (subclause 5.4.5) (if such a configuration exists) is considered as corresponding SR configuration for the triggered SR.

RRC configures the following parameters for the scheduling request procedure:
  sr-ProhibitTimer (per SR configuration);
  sr-TransMax (per SR configuration).

The following UE variables are used for the scheduling request procedure:
  SR_COUNTER (per SR configuration).

If an SR is triggered and there are no other SRs pending corresponding to the same SR configuration, the MAC entity shall set the SR_COUNTER of the corresponding SR configuration to 0.

When an SR is triggered, it shall be considered as pending until it is cancelled. All pending SR(s) triggered prior to the MAC PDU assembly shall be cancelled and each respective sr-ProhibitTimer shall be stopped when the MAC PDU is transmitted and this PDU includes a Long or Short BSR MAC CE which contains buffer status up to (and including) the last event that triggered a BSR (see subclause 5.4.5) prior to the MAC PDU assembly. All pending SR(s) shall be cancelled and each respective sr-ProhibitTimer shall be stopped when the UL grant(s) can accommodate all pending data available for transmission.

Only PUCCH resources on a BWP which is active at the time of SR transmission occasion are considered valid.

As long as at least one SR is pending, the MAC entity shall for each pending SR:

1> if the MAC entity has no valid PUCCH resource configured for the pending SR:
  2> initiate a Random Access procedure (see subclause 5.1) on the SpCell and cancel the pending SR.
1> else, for the SR configuration corresponding to the pending SR:
  2> when the MAC entity has an SR transmission occasion on the valid PUCCH resource for SR configured; and
  2> if sr-ProhibitTimer is not running at the time of the SR transmission occasion; and
  2> if the PUCCH resource for the SR transmission occasion does not overlap with a measurement gap; and
  2> if the PUCCH resource for the SR transmission occasion does not overlap with a UL-SCH resource:
    1. 3> if SR_COUNTER<sr-TransMax:
      4> increment SR_COUNTER by 1;
      4> instruct the physical layer to signal the SR on one valid PUCCH resource for SR;
      4> start the sr-ProhibitTimer.
    2. 3> else:
      4> notify RRC to release PUCCH for all Serving Cells;
      4> notify RRC to release SRS for all Serving Cells;
      4> clear any configured downlink assignments and uplink grants;
      4> clear any PUSCH resources for semi-persistent CSI reporting;

4> initiate a Random Access procedure (see subclause 5.1) on the SpCell and cancel all pending SRs.

NOTE 1: The selection of which valid PUCCH resource for SR to signal SR on when the MAC entity has more than one overlapping valid PUCCH resource for the SR transmission occasion is left to UE implementation.

NOTE 2: If more than one individual SR triggers an instruction from the MAC entity to the PHY layer to signal the SR on the same valid PUCCH resource, the SR_COUNTER for the relevant SR configuration is incremented only once.

The MAC entity may stop, if any, ongoing Random Access procedure due to a pending SR which has no valid PUCCH resources configured, which was initiated by MAC entity prior to the MAC PDU assembly. Such a Random Access procedure may be stopped when the MAC PDU is transmitted using a UL grant other than a UL grant provided by Random Access Response, and this PDU includes a BSR MAC CE which contains buffer status up to (and including) the last event that triggered a BSR (see subclause 5.4.5) prior to the MAC PDU assembly, or when the UL grant(s) can accommodate all pending data available for transmission.

5.4.5 Buffer Status Reporting

The Buffer Status reporting (BSR) procedure is used to provide the serving gNB with information about UL data volume in the MAC entity.

RRC configures the following parameters to control the BSR:
periodicBSR-Timer;
retxBSR-Timer;
logicalChannelSR-DelayTimerApplied;
logicalChannelSR-DelayTimer;
logicalChannelSR-Mask;
logicalChannelGroup.

Each logical channel may be allocated to an LCG using the logicalChannelGroup. The maximum number of LCGs is eight.

The MAC entity determines the amount of UL data available for a logical channel according to the data volume calculation procedure in TSs 38.322 [3] and 38.323 [4].

A BSR shall be triggered if any of the following events occur:
UL data, for a logical channel which belongs to an LCG, becomes available to the MAC entity; and either
 this UL data belongs to a logical channel with higher priority than the priority of any logical channel containing available UL data which belong to any LCG; or
 none of the logical channels which belong to an LCG contains any available UL data.
in which case the BSR is referred below to as 'Regular BSR';
UL resources are allocated and number of padding bits is equal to or larger than the size of the Buffer Status Report MAC CE plus its subheader, in which case the BSR is referred below to as 'Padding BSR';
retxBSR-Timer expires, and at least one of the logical channels which belong to an LCG contains UL data, in which case the BSR is referred below to as 'Regular BSR';
periodicBSR-Timer expires, in which case the BSR is referred below to as 'Periodic BSR'.

NOTE: When Regular BSR triggering events occur for multiple logical channels simultaneously, each logical channel triggers one separate Regular BSR.

For Regular BSR, the MAC entity shall:
 1> if the BSR is triggered for a logical channel for which logicalChannelSR-DelayTimerApplied is configured by upper layers:
  2> start or restart the logicalChannelSR-DelayTimer.
 1> else:
  2> if running, stop the logicalChannelSR-DelayTimer.

For Regular and Periodic BSR, the MAC entity shall:
 1> if more than one LCG has data available for transmission when the MAC PDU containing the BSR is to be built:
  2> report Long BSR for all LCGs which have data available for transmission.
 1> else:
  2> report Short BSR.

For Padding BSR:
 1> if the number of padding bits is equal to or larger than the size of the Short BSR plus its subheader but smaller than the size of the Long BSR plus its subheader:
  2> if more than one LCG has data available for transmission when the BSR is to be built:
   3. 3> if the number of padding bits is equal to the size of the Short BSR plus its subheader:
    4> report Short Truncated BSR of the LCG with the highest priority logical channel with data available for transmission.
   4. 3> else:
    4> report Long Truncated BSR of the LCG(s) with the logical channels having data available for transmission following a decreasing order of the highest priority logical channel (with or without data available for transmission) in each of these LCG(s), and in case of equal priority, in increasing order of LCGID.
  2> else:
   5. 3> report Short BSR.
 1> else if the number of padding bits is equal to or larger than the size of the Long BSR plus its subheader:
  2> report Long BSR for all LCGs which have data available for transmission.

For BSR triggered by retxBSR-Timer expiry, the MAC entity considers that the logical channel that triggered the BSR is the highest priority logical channel that has data available for transmission at the time the BSR is triggered.

The MAC entity shall:
 1> if the Buffer Status reporting procedure determines that at least one BSR has been triggered and not cancelled:
  2> if UL-SCH resources are available for a new transmission and the UL-SCH resources can accommodate the BSR MAC CE plus its subheader as a result of logical channel prioritization:
   6. 3> instruct the Multiplexing and Assembly procedure to generate the BSR MAC CE(s);
   7. 3> start or restart periodicBSR-Timer except when all the generated BSRs are long or short Truncated BSRs;
   8. 3> start or restart retxBSR-Timer. 2> if a Regular BSR has been triggered and logicalChannelSR-DelayTimer is not running:
   9. 3> if there is no UL-SCH resource available for a new transmission; or
   10. 3> if the MAC entity is configured with configured uplink grant(s) and the Regular BSR was triggered for a logical channel for which logicalChannelSR-Mask is set to false; or
   11. 3> if the UL-SCH resources available for a new transmission do not meet the LCP mapping restrictions (see subclause 5.4.3.1) configured for the logical channel that triggered the BSR:

4> trigger a Scheduling Request.

NOTE: UL-SCH resources are considered available if the MAC entity has an active configuration for either type of configured uplink grants, or if the MAC entity has received a dynamic uplink grant, or if both of these conditions are met. If the MAC entity has determined at a given point in time that UL-SCH resources are available, this need not imply that UL-SCH resources are available for use at that point in time.

A MAC PDU shall contain at most one BSR MAC CE, even when multiple events have triggered a BSR. The Regular BSR and the Periodic BSR shall have precedence over the padding BSR.

The MAC entity shall restart retxBSR-Timer upon reception of a grant for transmission of new data on any UL-SCH. All triggered BSRs may be cancelled when the UL grant(s) can accommodate all pending data available for transmission but is not sufficient to additionally accommodate the BSR MAC CE plus its subheader. All BSRs triggered prior to MAC PDU assembly shall be cancelled when a MAC PDU is transmitted and this PDU includes a Long or Short BSR MAC CE which contains buffer status up to (and including) the last event that triggered a BSR prior to the MAC PDU assembly.

NOTE: MAC PDU assembly can happen at any point in time between uplink grant reception and actual transmission of the corresponding MAC PDU. BSR and SR can be triggered after the assembly of a MAC PDU which contains a BSR MAC CE, but before the transmission of this MAC PDU. In addition, BSR and SR can be triggered during MAC PDU assembly.

6.1.3 MAC Control Elements (CEs)

6.1.3.1 Buffer Status Report MAC CEs

Buffer Status Report (BSR) MAC CEs Consist of Either:

Short BSR format (fixed size); or

Long BSR format (variable size); or

Short Truncated BSR format (fixed size); or

Long Truncated BSR format (variable size).

The BSR formats are identified by MAC PDU subheaders with LCIDs as specified in Table 6.2.1-2.

The fields in the BSR MAC CE are defined as follows:

LCG ID: The Logical Channel Group ID field identifies the group of logical channel(s) whose buffer status is being reported. The length of the field is 3 bits;

$LCG_i$: For the Long BSR format, this field indicates the presence of the Buffer Size field for the logical channel group i. The $LCG_i$ field set to "1" indicates that the Buffer Size field for the logical channel group i is reported. The $LCG_i$ field set to "0" indicates that the Buffer Size field for the logical channel group i is not reported. For the Long Truncated BSR format, this field indicates whether logical channel group i has data available. The $LCG_i$ field set to "1" indicates that logical channel group i has data available. The $LCG_i$ field set to "0" indicates that logical channel group i does not have data available;

Buffer Size: The Buffer Size field identifies the total amount of data available according to the data volume calculation procedure in TSs 38.322 [3] and 38.323 [4] across all logical channels of a logical channel group after the MAC PDU has been built (i.e. after the logical channel prioritization procedure, which may result the value of the Buffer Size field to zero). The amount of data is indicated in number of bytes. The size of the RLC and MAC headers are not considered in the buffer size computation. The length of this field for the Short BSR format and the Short Truncated BSR format is 5 bits. The length of this field for the Long BSR format and the Long Truncated BSR format is 8 bits. The values for the 5-bit and 8-bit Buffer Size fields are shown in Tables 6.1.3.1-1 and 6.1.3.1-2, respectively. For the Long BSR format and the Long Truncated BSR format, the Buffer Size fields are included in ascending order based on the $LCG_i$. For the Long Truncated BSR format the number of Buffer Size fields included is maximised, while not exceeding the number of padding bits.

NOTE: The number of the Buffer Size fields in the Long BSR and Long Truncated BSR format can be zero.

Figure 11:
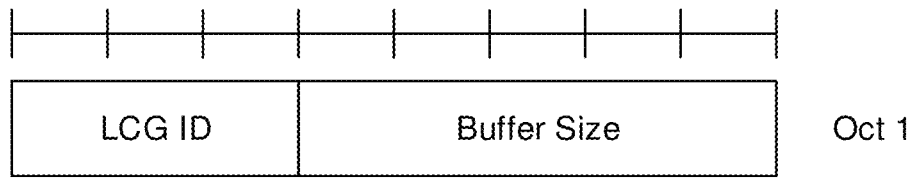
FIG. 11 is a reproduction of FIG. 6.1.3.1-1 of 3GPP TS 38.321 V15.4.0.

FIG. 6.1.3.1-1 of 3GPP TS 38.321 V15.4.0, Entitled "Short BSR and Short Truncated BSR MAC CE", is Reproduced as FIG. 11

Figure 12:
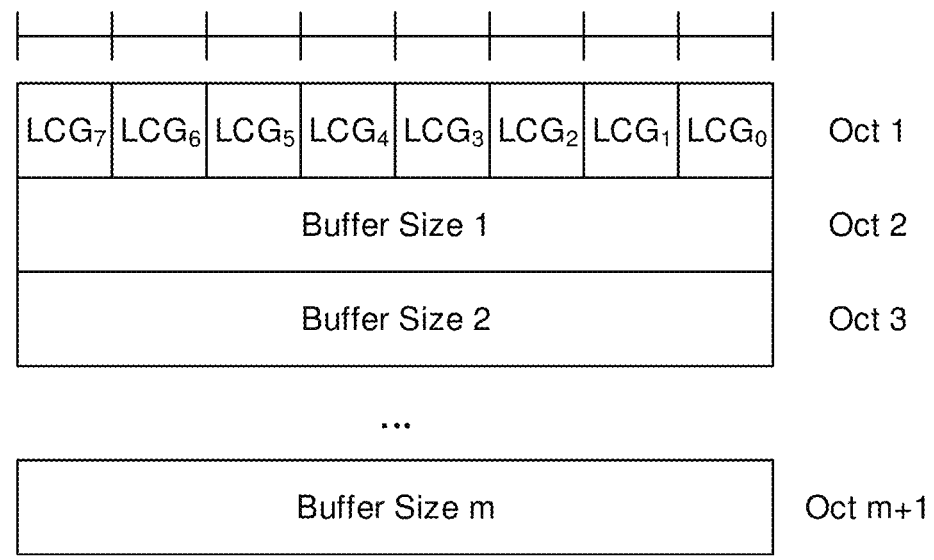
FIG. 12 is a reproduction of FIG. 6.1.3.1-2 of 3GPP TS 38.321 V15.4.0.

FIG. 6.1.3.1-2 of 3GPP TS 38.321 V15.4.0, Entitled "Long BSR and Long Truncated BSR MAC CE", is Reproduced as FIG. 12

Table 6.1.3.1-1 of 3GPP TS 38.321 V15.4.0, Entitled "Buffer Size Levels (in Bytes) for 5-Bit Buffer Size Field", is Reproduced as FIG. 13

Table 6.1.3.1-2 of 3GPP TS 38.321 V15.4.0, Entitled "Buffer Size Levels (in Bytes) for 8-Bit Buffer Size Field", is Reproduced as FIGS. 14A and 14B 6.2.1 MAC Subheader for DL-SCH and UL-SCH The MAC subheader consists of the following fields:

LCID: The Logical Channel ID field identifies the logical channel instance of the corresponding MAC SDU or the type of the corresponding MAC CE or padding as described in Tables 6.2.1-1 and 6.2.1-2 for the DL-SCH and UL-SCH respectively. There is one LCID field per MAC subheader. The LCID field size is 6 bits;

L: The Length field indicates the length of the corresponding MAC SDU or variable-sized MAC CE in bytes. There is one L field per MAC subheader except for subheaders corresponding to fixed-sized MAC CEs, padding, and MAC SDUs containing UL CCCH. The size of the L field is indicated by the F field;

F: The Format field indicates the size of the Length field. There is one F field per MAC subheader except for subheaders corresponding to fixed-sized MAC CEs, padding, and MAC SDUs containing UL CCCH. The size of the F field is 1 bit. The value 0 indicates 8 bits of the Length field. The value 1 indicates 16 bits of the Length field;

R: Reserved bit, set to "0".

The MAC subheader is octet aligned.

Table 6.2.1-1 of 3GPP TS 38.321 V15.4.0, Entitled "Values of LCID for DL-SCH", is Reproduced as FIG. 15

Table 6.2.1-2 of 3GPP TS 38.321 V15.4.0, Entitled "Values of LCID for UL-SCH", is Reproduced as FIG. 16

According to the description provided in 3GPP TR 38.874, an IAB-node is a RAN (Random Access Network) node that supports wireless access to UEs and wirelessly backhauls the access traffic and IAB-donor is a RAN node which provides UE's interface to core network and wireless backhauling functionality to IAB nodes. The IAB-node may also be referred to as the rTRP (Relay Transmission Reception Point). The IAB-donor may also be referred to as the anchor node.

Each IAB-node may include Mobile-Termination (MT) part and network (NW) part. The MT part of the IAB-node has at least part of the functionalities that typical user equipment (UE) should have and the NW part of the IAB-node has at least part of the functionalities that typical network node (e.g. gNB) should have.

When a first IAB-node acts as a UE through its MT part to another second IAB-node or IAB-donor, the first IAB-node may be referred to as a child IAB-node of the second IAB-node or IAB-donor. When a third IAB-node acts as a network node through its NW part to another fourth IAB-node, the third IAB-node may be referred to as a parent IAB-node of the fourth IAB-node.

Downlink (DL) IAB transmissions include the transmissions on backhaul links from a parent IAB-node to its child IAB-node and the transmissions on access links from an IAB-node to UEs, which are served by the IAB-node. Uplink (UL) IAB transmissions include the transmissions on backhaul links from a child IAB-node to its parent IAB-node or IAB-donor.

The backhaul link could be in-band or out-of-hand with respect to the access link, depending on whether the backhaul link and the access link are at least partially overlapped in frequency or not. In-band backhauling creates half-duplexing or interference constraints, which imply that the IAB-node cannot transmit and receive simultaneously on both links.

An IAB-node could be physically fixed (i.e. its location is fixed) or mobile (e.g. on buses or trains). Agreements of 3GPP RAN2 #104 meeting with respect to user plane aspects of "Study on Integrated Access and Backhaul for NR" are provided in RAN2 #104 meeting minutes as follows:

| Agreements |
|---|
| We go for the consolidated example 1, "adapt above RLC" + "LCID ext" |
| We keep LCID extension in the solution description, as this is a method to achieve 1:1 mapping |
| Confirm that UE is not expected to need to implement the LCID extension. |
| Only Hop-by-hop ARQ in Rel-16 |
| The Rel.16 IAB WI focuses on only "IP termination at Access IAB node" |
| Confirm that GTP-U is included in the UP stack for F1-U |

Figure 10:
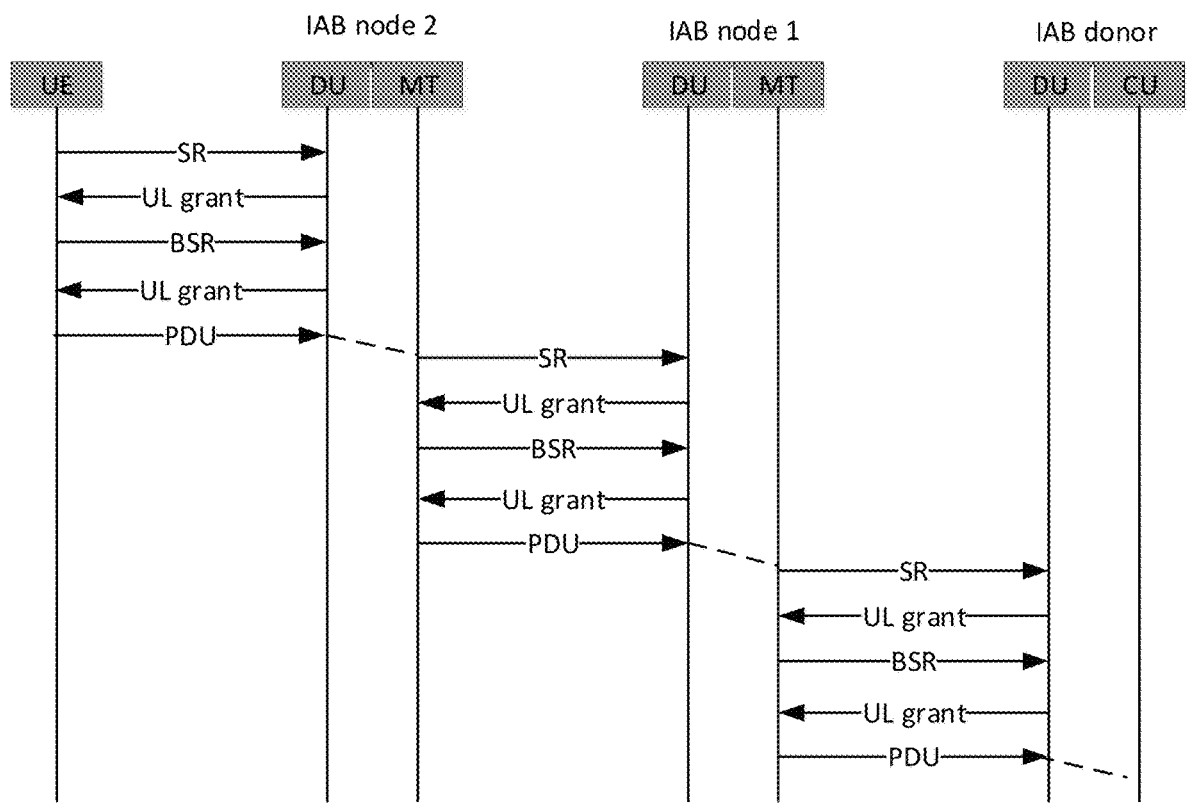
FIG. 10 is a reproduction of FIGS. 8.6-1 of 3GPP TR 38.874 V0.7.0.

According to FIG. 10, in a multi-hop network, the scheduling delays suffering for the uplink data are likely to accumulate due to number of hops and may require mitigation mechanisms. As discussed in Section 8.6 of 3GPP TR 38.874, the underlying reason for these delays is that the MT part of an JAB-node can only request uplink resources for the UL data transmission after it actually receives the data to be transmitted, based on the current NR MAC specification (TS 38.321 V15.4.0).

As also discussed in Section 8.6 of 3GPP TR 38.874, one approach to mitigate such delays consists of initiating an uplink resource request at an IAB-node based on data that is expected to arrive and this would enable IAB-node to obtain uplink resource prior to actual data reception from its child IAB-node or a UE that it serves. It is clear that this approach would have behaviours different from the current NR MAC specification (TS 38.321 V15.4.0). Therefore, the details of this approach, including the content and triggers of the SR (Scheduling Request) or BSR (Buffer Status Report) and uplink scheduling, would need further development.

Up to now, the current MAC specification (TS 38.321 V15.4.0) deals with only UE "self-generated" uplink traffic. Even if the uplink traffic for UE is transferred from other device, it is still considered and handled as UE "self-generated" uplink traffic. When the UE "self-generated" uplink traffic is known by the UE, it is already available for uplink transmission. So the UE "self-generated" uplink traffic has no stage of expected to arrive. As the analysis discussed above, since there is only one-hop, there is no accumulated scheduling delays.

For the IAB-node, there may be both "self-generated" uplink traffic and "child node-delivered" uplink traffic. It is possible to assume that the IAB-node "self-generated" uplink traffic is handled the same as before by original SR or BSR mechanism and the approach mentioned above to mitigate scheduling delays is only applied to the IAB-node "child node-delivered" uplink traffic, which has two stages of "expected to arrive" and "actually received". The stage of "actually received" is considered the same as the already available for uplink transmission status of "self-generated" uplink traffic.

To mitigate the scheduling delay, an IAB-node may initiate an uplink resource request based on data that is expected to arrive, e.g. data from a child node of the IAB-node. The child node may be a UE or another IAB-node. If the SR or BSR mechanism, similar to what specified in 5.4.4 and 5.4.5 of current NR MAC specification (TS 38.321 V15.4.0), is used for the IAB-node uplink resource request, a BSR for IAB (e.g. IAB Regular BSR) could be triggered if there is uplink traffic expected to arrive, in which uplink traffic may include user plane data and/or control plane signaling. The IAB Regular BSR may have same characteristics as the ordinary Regular BSR (e.g. normal BSR as specified below, Regular BSR as specified in the current TR 38.321), including triggering SR and re-triggering itself which may be controlled by a timer.

For example, an IAB-node could trigger a BSR for IAB (e.g. IAB Regular BSR) due to reception of a BSR from its child node. After that, the triggered "IAB Regular BSR" may further trigger the SR if the triggering conditions for SR are fulfilled, e.g. as specified in Section 5.4.4 of current MAC specification (TS 38.321 V15.4.0). The BSR for IAB may be triggered without data already available for uplink transmission in an IAB-node. The report content corresponding to the BSR for IAB may indicate data amount (or buffer size to be reported in BSR MAC CE) including both the data actually received (if any) and data expected to arrive for uplink transmission or only data expected to arrive for uplink transmission, depending on the details of design.

The BSR triggered based on data expected to arrive may be called early-triggered BSR. The BSR triggered based on data already available for transmission may be called normal BSR. The BSR triggered as described in Section 5.4.5 of the current MAC specification (TS 38.321 V15.4.0) may be called legacy BSR.

The early-triggered BSR may be a Regular BSR. The early-triggered BSR may not be a Periodic BSR. The early-triggered BSR may not be a Padding BSR. The normal BSR may be a Regular BSR. The normal BSR may not be a Periodic BSR. The normal BSR may not be a Padding BSR. The normal BSR may be a legacy BSR. The legacy BSR may be a Regular BSR, a Periodic BSR, or a Padding BSR.

It is possible that when a child node of an IAB-node has data available for uplink transmission, a (normal) BSR is triggered in the child node. The child node transmits the BSR to its parent node, i.e. the IAB-node. After receiving the BSR from the child node, the IAB-node may trigger an early-triggered BSR due to the reception of the BSR from the child node. The BSR report (e.g. BSR MAC CE) for the early-triggered BSR may indicate the (estimated or rough) data amount including the data expected to arrive from the child node, which has not been received by the IAB-node. The BSR report may indicate data amount expected to arrive without taking any data amount already available for transmission into account, e.g. if the IAB-node does not have any data already available for uplink transmission. And the IAB-node allocates UL grant to the child node for the child node to transmit uplink data. After the IAB-node receiving the data from the child node, the data expected to arrive becomes the data actually received. For the IAB-node, the data actually received should be considered as uplink data available for transmission, which may trigger a normal BSR (e.g. a "Regular BSR"), based on the triggering conditions described in Section 5.4.5 in TS 38.321 V15.4.0. The BSR report (e.g. BSR MAC CE) for the normal BSR indicates the data amount including data available for uplink transmission. The indicated data amount may also include data expected to arrive from the child node, which has not been received by the IAB-node. However, considering that the indicated data amount has been taken into account by the BSR report for the early-triggered BSR, triggering and/or reporting another "Regular BSR" (e.g. the normal BSR) due to the same data would cause the side effect of wasting power for additional SR transmissions and the side effect of occupying uplink resource for BSR MAC CE transmissions. For the parent node of the IAB-node, the secondly triggered BSR provide no additional information, and thus seems redundant.

In order to avoid the issue, it is possible to treat the "self-generated" uplink traffic of the IAB-node and the "child node-delivered" uplink traffic separately. The IAB-node "self-generated" uplink traffic is handled the same as before by original SR or BSR mechanism. For example, the triggering condition for Regular BSR considers "self-generated" uplink traffic, with all logic channels for "child node-delivered" uplink traffic excluded. On the other hand, the triggering condition for TAB Regular BSR considers the "child node-delivered" uplink traffic. For example, the BSR from child node indicates that there is "child node-delivered" uplink traffic "expected to arrive", and an IAB Regular BSR may be triggered due to this indication.

To solve the problem, a normal BSR after an early-triggered BSR should be triggered more efficiently. For example, if the data available for uplink transmission in a IAB-node actually comes from its child node, and has been taken into account in a previously triggered BSR (e.g. has been considered as data expected to arrive and/or already reported in early-triggered BSR), the data available for uplink transmission does not trigger a BSR (even if it fulfills the condition to trigger a (Regular) BSR specified in Section 5.4.5 of the current NR MAC specification (TS 38.321 V15.4.0), e.g. the data belongs to a logical channel with higher priority than the priority of any logical channel containing available UL (Uplink) data which belong to any LCG (Logical Control Channel), or none of the logical channels which belong to a LCG contains any available UL data).

In one alternative, the IAB-node does not trigger the "Regular BSR" for the uplink data available for transmission as the data expected to arrive becoming the data actually received if the "Regular BSR" has been triggered for the data expected to arrive. For any IAB-node, the uplink traffic may include the traffic from child nodes, which may be a child IAB-node and/or a UE, and the traffic from itself. If the traffic from child nodes have already been taken into account as the data expected to arrive, there is no reason to consider the traffic from child nodes again after the actual reception. On the other hand, the traffic from the IAB-node itself should have not been treated as the data expected to arrive, so it should be able to trigger the "Regular BSR" as the uplink data become available for transmission and the behavior meets the design purpose of the BSR.

In one alternative, the IAB-node determines whether to trigger a BSR (e.g. a normal BSR, a Regular BSR) by comparing logical channel priority of data becoming available for transmission with both the logical channel priority of data expected to arrive (from a child node) and the logical channel priority of data (already) available for transmission. For example, the data becoming available for transmission that triggers a BSR (e.g. a normal BSR, a Regular BSR) should belong to a logical channel with higher priority than the priority of any logical channel expected to have data soon (which belong to any LCG) and any logical channel containing available UL data which belong to any LCG. The data (already) available for transmission may be limited to the data received from a child node (and/or data forwarded by a child node), e.g. the data originated by the IAB-node is excluded. The logical channel expected to have data soon may mean that the IAB-node has reported the (estimated) data amount for the logical channel (or the LCG that the logical channel belongs) in a BSR report, e.g. corresponding to an early-triggered BSR. The logical channel expected to have data soon may not have data already available for transmission. The logical channel of data expected to arrive may be mapped from the logical channel of the child node. The IAB-node could determine whether a logical channel have data expected to arrive (or expected to have data soon) based on the BSR reported by the child node and the bearer mapping between the IAB-node and the child node.

In one example, a BSR (e.g. a normal BSR, a Regular BSR) could be triggered if:
UL data, for a logical channel which belongs to an LCG, becomes available to the MAC entity, and either
the UL data belongs to a logical channel with higher priority than the priority of any logical channel containing available UL data or expected to have UL data which belong to any LCG; or
none of the logical channels which belong to an LCG contains any available UL data or expected to have UL data If data becomes available for transmission, and the data becoming available for transmission belongs to a logical channel with higher priority than the priority of any logical channel containing available UL data which belong to any LCG, but the logical channel has no higher priority than the priority of any logical channel expected to have UL data soon, a BSR (e.g. a normal BSR, a Regular BSR) may not be triggered due to the data becoming available for transmission.

When data expected to arrive is actually received by the IAB-node, the data expected to arrive may become data available for transmission. However, since the data becoming available for transmission belongs to a logical channel expected to have UL data (before the data arrives), the data becoming available for transmission may not be considered to have higher priority than any logical channel expected to have UL data. Thus, the data becoming available for transmission may not trigger a BSR (e.g. a normal BSR, a Regular BSR).

Alternatively, under at least one of the conditions (of triggering or not triggering a BSR) mentioned above, a BSR may be triggered but the BSR does not trigger a SR. For example, a BSR (e.g. a normal BSR, a Regular BSR) may be triggered due to data becoming available for transmission if the data becoming available for transmission belongs to a logical channel with higher priority than the priority of any logical channel containing available UL data which belongs to any LCG, but the logical channel has no higher priority than the priority of any logical channel expected to have UL data soon. The triggered BSR may not trigger a SR. Alternatively or additionally, if data becomes available for transmission, and the data belongs to a logical channel with higher priority than the priority of any logical channel containing available UL data which belongs to any LCG and any logical channel expected to have UL data soon, a BSR may be triggered and the BSR could trigger a SR.

The logical channel expected to have data soon may mean that the IAB-node has reported the (estimated) data amount for the logical channel (or the LCG that the logical channel belongs) in a BSR report, e.g. corresponding to an early-triggered BSR. The logical channel expected to have data soon may not have data already available for transmission. The logical channel of data expected to arrive may be mapped from the logical channel of the child node. The IAB-node could determine whether a logical channel have data expected to arrive (or expected to have data soon) based on the BSR reported by the child node and the bearer mapping between the IAB-node and the child node.

The BSR may be a Regular BSR. The triggered BSR may behave like a Periodic BSR. The logicalChannelSR-Delay-Timer may not be running. There may be no UL-SCH resource available for a new transmission. Configured uplink grant(s) may or may not be configured. The BSR may be triggered for a logical channel for which logicalChannelSR-Mask is set to false. There may be UL-SCH resource available for a new transmission, but it doesn't meet the LCP mapping restriction (as specified in Section 5.4.3.1 of NR MAC specification (TS 38.321) configured for the logical channel that triggered the BSR.

Alternatively, under at least one of the conditions (of triggering or not triggering a BSR) mentioned above, a BSR may be triggered. In the BSR report for the triggered BSR, the indicated data amount (e.g. buffer status in BSR MAC CE) for the data available for transmission may be separated from the indicated data amount (e.g. buffer status in BSR MAC CE) for the data expected to arrive. It may apply even if the data available for transmission and the data expected to arrive belong to the same logical channel or LCG. In this case, triggering a normal BSR after triggering an early-triggered BSR (e.g. when data expected to arrive becomes data available for transmission) may not be redundant since data expected to arrive and data available for transmission are considered differently in the BSR report.

For example, there are at least two fields in a BSR report (e.g. BSR MAC CE). One field could be used to indicate (rough) data amount (or buffer status) of data available for transmission for at least a logical channel (or LCG). The other field could be used to indicate (rough or estimated) data amount (or buffer status) of data expected to arrive for at least a logical channel (or LCG). The (rough or estimated) data amount (or buffer status) of data expected to arrive for at least a logical channel (or LCG) may be derived from a BSR received from a child node. The logical channel of data expected to arrive may be mapped from the logical channel of the child node. The IAB-node could determine whether a logical channel have data expected to arrive (or expected to have data soon) based on the BSR reported by the child node and the bearer mapping between the IAB-node and the child node.

In one example, after an IAB-node receives a BSR from its child node, the IAB-node could trigger a BSR (e.g. an early-triggered BSR) due to the BSR from the child node. The BSR report for the triggered BSR (e.g. the early-triggered BSR) could indicate the (estimated) amount of data expected to arrive (e.g. derived from the BSR from the child node). The BSR report for the triggered BSR (e.g. the early-triggered BSR) could indicate the amount of data available for transmission (e.g. 0). The BSR report for the triggered BSR (e.g. the early-triggered BSR) could indicate the (estimated) amount of data expected to arrive (e.g. derived from the BSR from the child node) and the amount of data available for transmission (e.g. 0). After the IAB-node receives actual data from the child node, the IAB-node could trigger another BSR (e.g. a normal BSR) due to data available for transmission with higher priority (higher than any logical channel with data available for transmission and/or data expected to arrive).

In one example, the BSR report for the secondly triggered BSR (e.g. the normal BSR) could indicate the (estimated) amount of data expected to arrive (e.g. derived from the BSR from the child node and the received data). The BSR report for the secondly triggered BSR (e.g. the normal BSR) could indicate the amount of data available for transmission (e.g. derived from the data received from the child node). The BSR report for the secondly triggered BSR (e.g. the normal BSR) could indicate the (estimated) amount of data expected to arrive (e.g. derived from the BSR from the child node and the received data) and the amount of data available for transmission (e.g. derived from the data received from the child node).

The (estimated) data amount (or buffer status) of data expected to arrive and the data amount (or buffer status) of data available for transmission could be indicated separately (e.g. indicated in different field).

Figure 17:
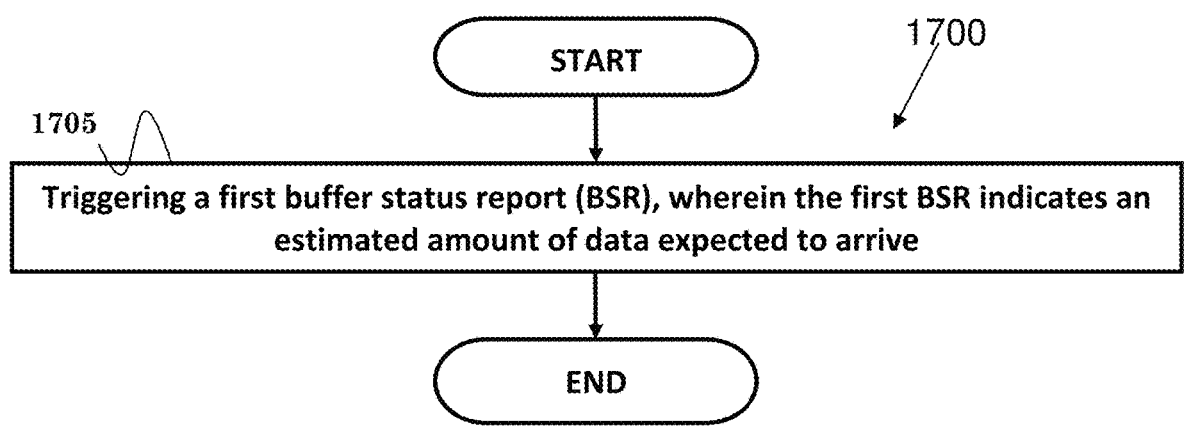
FIG. 17 is a flow chart according to one exemplary embodiment.

FIG. 17 is a flow chart 1700 according to one exemplary embodiment from the perspective of a first wireless transmit/receive unit (WTRU). In step 1705, the first WTRU triggers a first BSR, wherein the first BSR indicates an estimated amount of data expected to arrive.

In one embodiment, the first BSR could be triggered due to reception of a second BSR from a second WTRU, and the second WTRU could be a child node of the first WTRU. The first BSR could be transmitted to a third WTRU, and the third WTRU could be a parent node of the first WTRU.

In one embodiment, the estimated amount of data expected to arrive and an amount of data available for transmission are indicated separately.

In one embodiment, the first BSR may include a first field indicating the estimated amount of data expected to arrive and a second field indicating the amount of data available for transmission.

In one embodiment, the first BSR could be a Regular BSR. In one embodiment, the estimated amount of data expected to arrive is for a logical channel group (LCG).

In one embodiment, the first BSR and/or the second BSR could be a MAC (Medium Access Control) CE (Control Element). In one embodiment, the first WTRU could derive the amount of data expected to arrive based on the second BSR. In one embodiment, the WTRU could be an IAB (Integrated Access and Backhaul)-node, the second WTRU is an IAB-node or a UE, and the third WTRU is an IAB-node or an IAB-donor.

Referring back to FIGS. 3 and 4, in one exemplary embodiment of a first WTRU, the device 300 includes a program code 312 stored in the memory 310. The CPU 308 could execute program code 312 to enable the first WTRU to trigger a first BSR, wherein the first BSR indicates an estimated amount of data expected to arrive. Furthermore, the CPU 308 can execute the program code 312 to perform all of the above-described actions and steps or others described herein.

Figure 18:
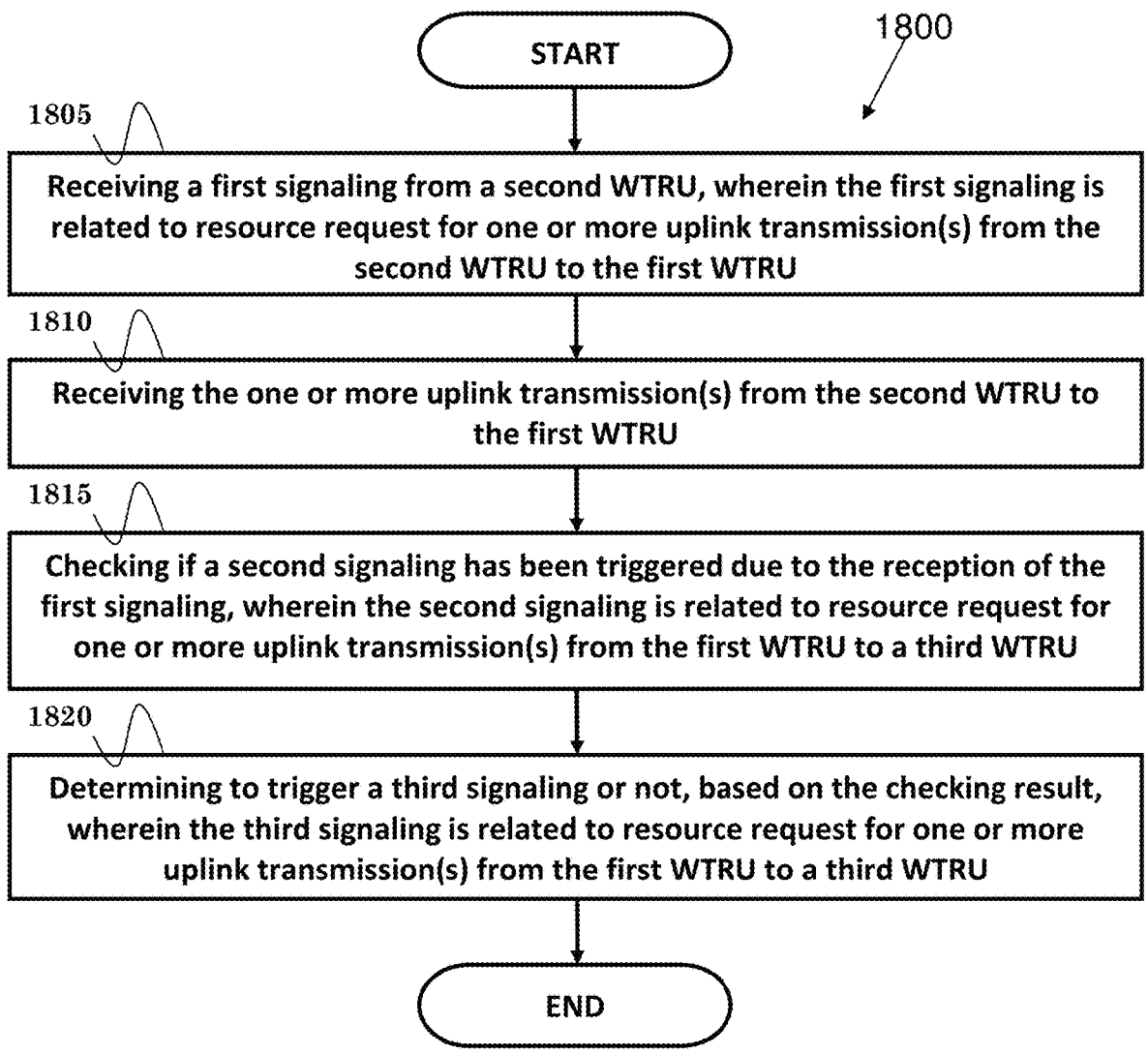
FIG. 18 is a flow chart according to one exemplary embodiment.

FIG. 18 is a flow chart 1800 according to one exemplary embodiment from the perspective of a first WTRU, wherein the first WTRU is capable of integrating access link and backhaul link. In step 1805, the first WTRU receives a first signaling from a second WTRU, wherein the first signaling is related to resource request for one or more uplink transmission(s) from the second WTRU to the first WTRU. In step 1810, the first WTRU receives the one or more uplink transmission(s) from the second WTRU to the first WTRU. In step 1815, the first WTRU checks if a second signaling has been triggered due to the reception of the first signaling, wherein the second signaling is related to resource request for one or more uplink transmission(s) from the first WTRU to a third WTRU. In step 1820, the first WTRU determines to trigger a third signaling or not, based on the checking result, wherein the third signaling is related to resource request for one or more uplink transmission(s) from the first WTRU to a third WTRU.

In one embodiment, the first WTRU may not trigger the third signaling if the checking result is yes (i.e.: the second signaling has been triggered due to the reception of the first signaling). The first WTRU may trigger the third signaling if the checking result is no (i.e. the second signaling has not been triggered due to the reception of the first signaling). The first WTRU may trigger the third signaling if the checking result is yes (i.e. the second signaling has been triggered due to the reception of the first signaling). The first WTRU may not trigger the third signaling if the checking result is no (i.e. the second signaling has not been triggered due to the reception of the first signaling).

In one embodiment, the first WTRU could be an IAB-node, the second WTRU could be an IAB-node or a UE (i.e. the child node of the first WTRU), and the third WTRU could be an IAB-node or an IAB-donor, or a gNB, or part of a gNB (i.e. the parent node of the first WTRU).

In one embodiment, the first signaling could be a BSR or a SR. The second signaling could be a BSR (e.g.: IAB Regular BSR) or a SR. The third signaling could be a BSR (e.g.: IAB Regular BSR) or a SR.

In one embodiment, the one or more uplink transmission(s) from the second WTRU to the first WTRU could be related to the uplink resource allocation by the first WTRU based on the reception of the first signaling. The one or more uplink transmission(s) from the first WTRU to the third WTRU could be related to the uplink resource allocation by the third WTRU based on the reception of the second signaling and/or the third signaling.

Referring back to FIGS. 3 and 4, in one exemplary embodiment of a first WTRU, the device 300 includes a program code 312 stored in the memory 310. The CPU 308 could execute program code 312 to enable the first WTRU (i) to receive a first signaling from a second WTRU, wherein the first signaling is related to resource request for one or more uplink transmission(s) from the second WTRU to the first WTRU, (ii) to receive the one or more uplink transmission(s) from the second WTRU to the first WTRU, (iii) to check if a second signaling has been triggered due to the reception of the first signaling, wherein the second signaling is related to resource request for one or more uplink transmission(s) from the first WTRU to a third WTRU, and (iv) to determine to trigger a third signaling or not, based on the checking result, wherein the third signaling is related to resource request for one or more uplink transmission(s) from the first WTRU to a third WTRU. Furthermore, the CPU 308 can execute the program code 312 to perform all of the above-described actions and steps or others described herein.

Based on the current NR MAC specification (TS 38.321 V15.4.0), the triggered BSR may be cancelled when the uplink grant(s) can accommodate all pending data available for transmission but is not sufficient to additionally accommodate the BSR MAC CE plus its subheader. Since the pending data available for transmission does not include the data expected to arrive for uplink transmission but not yet received, this criteria about BSR cancellation may cause the side effect that the buffer size about the data expected to arrive does not be reported.

Based on the current NR MAC specification (TS 38.321 V15.4.0), after a previous BSR is triggered (and reported), the IAB-node may receive an uplink grant from its parent node. If the uplink grant can accommodate all pending data available for transmission in the IAB-node but is not sufficient to additionally accommodate the BSR MAC CE plus its subheader, the early-triggered BSR is cancelled. And therefore no BSR would be reported in the uplink transmission (e.g. MAC PDU) corresponding to the uplink grant. The parent node may interpret that the IAB-node has no more data to be transmitted and does not allocate further uplink grant(s) to the IAB-node, but the data expected to arrive may be received and become data already available for transmission. Therefore the data from the child node would suffer more scheduling delay due to the cancellation of the early-triggered BSR.

To solve the problem, if an IAB-node is aware (or detect) that there is data to be transmitted soon or data expected to arrive soon (e.g. a non-empty BSR has been received from the child node, but no data or not all data indicated in the BSR has been received from the child node), the IAB-node may not cancel a triggered BSR for IAB if the received uplink grant can accommodate all pending data available for transmission but is not sufficiently to additionally accommodate a BSR MAC CE plus its subheader.

If the IAB-node is not aware (or not detect) that there is data to be transmitted soon or data expected to arrive soon (e.g. no BSR is received from the child node or any child node, and/or an BSR is received from some of the child node but it is empty BSR), the IAB-node could cancel a triggered BSR if the received uplink grant can accommodate all pending data available for transmission but is not sufficiently to additionally accommodate a BSR MAC CE plus its subheader. Alternatively or additionally, the BSR MAC CE should be included in the MAC PDU for transmission if there is still uplink traffic expected to arrive. When there is no uplink traffic expected to arrive, the BSR MAC CE may be cancelled for the condition described above. In other words, if the buffer size(s) reported are all zero, the BSR MAC CE may be cancelled for the condition described above. Alternatively or additionally, the triggered BSR may not be cancelled for the condition described above if there is still uplink traffic expected to arrive. This implies that the BSR MAC CE is not included in the MAC PDU for the condition described above, as original behavior, but the triggered BSR is not cancelled. This triggered and not cancelled BSR may trigger SR or cause the generation of BSR MAC CE for the following uplink grant(s).

Alternatively or additionally, if an early-triggered BSR has been triggered and not cancelled (or if the triggered BSR is an early-triggered BSR), the triggered BSR may not be cancelled if the received uplink grant can accommodate all pending data available for transmission but is not sufficiently to additionally accommodate a BSR MAC CE plus its subheader. Alternatively or additionally, if no early-triggered BSR has been triggered and not cancelled (or if the triggered BSR is other than an early-triggered BSR), the triggered BSR may be cancelled if the received uplink grant can accommodate all pending data available for transmission but is not sufficiently to additionally accommodate a BSR MAC CE plus its subheader. The triggered BSR may be a normal BSR or a legacy BSR.

The early-triggered BSR may be triggered due to BSR received from a child node. The early-triggered BSR may be cancelled due to inclusion of a BSR MAC CE in a MAC PDU. The BSR MAC CE may indicate data amount (or buffer status) including data expected to arrive (or expected to be transmitted) but not yet available for transmission in the IAB-node.

Alternatively or additionally, if the BSR to be reported includes non-empty buffer status (or data amount) of data expected to arrive or data to be transmitted soon (e.g. which has not been available for transmission), the triggered BSR may not be cancelled if the received uplink grant can accommodate all pending data available for transmission but is not sufficiently to additionally accommodate a BSR MAC CE plus its subheader. Alternatively or additionally, if the BSR to be reported does not include (non-empty) buffer status (or data amount) of data expected to arrive or data to be transmitted soon (e.g. which has not been available for transmission), the triggered BSR may be cancelled if the received uplink grant can accommodate all pending data available for transmission but is not sufficiently to additionally accommodate a BSR MAC CE plus its subheader.

The (non-empty) buffer status (or data amount) of data expected to arrive (or data to be transmitted soon) may correspond to a logical channel (or a LCG) expected to have UL data (soon). The logical channel expected to have UL data (soon) may mean that the IAB-node has reported the (estimated) data amount for the logical channel (or the LCG that the logical channel belongs) in a BSR report, e.g. corresponding to an early-triggered BSR. The logical channel expected to have UL data (soon) may not have data already available for transmission. The logical channel expected to have UL data (soon) may be mapped from the logical channel of the child node. The IAB-node could determine whether a logical channel have expected UL data based on the BSR reported by the child node and the bearer mapping between the IAB-node and the child node.

In one embodiment, a BSR that is not cancelled may mean that the BSR remains pending. A BSR MAC CE may be included in the uplink transmission (e.g. MAC PDU) corresponding to the uplink grant. Alternatively, a BSR MAC CE may not be included in the uplink transmission (e.g. MAC PDU) corresponding to the uplink grant (even if the triggered BSR is not cancelled). The BSR MAC CE may indicate (rough or estimated) data amount (or buffer status) of data expected to arrive for at least a logical channel (or LCG). The BSR MAC CE may indicate data amount (or buffer status) of data available for transmission for a logical channel (or LCG).

Different alternatives mentioned above may be used jointly. For example, several potential text modifications are shown below (the change to the current NR MAC specification TS 38.321 is indicated in bold):

"All triggered BSRs other than the BSR triggered based on data expected to arrive may be cancelled when the UL grant(s) can accommodate all pending data available for transmission but is not sufficient to additionally accommodate the BSR MAC CE plus its subheader."

"All triggered BSRs other than the BSR triggered due to BSR from a child node may be cancelled when the UL grant(s) can accommodate all pending data available for transmission but is not sufficient to additionally accommodate the BSR MAC CE plus its subheader."

Figure 19:
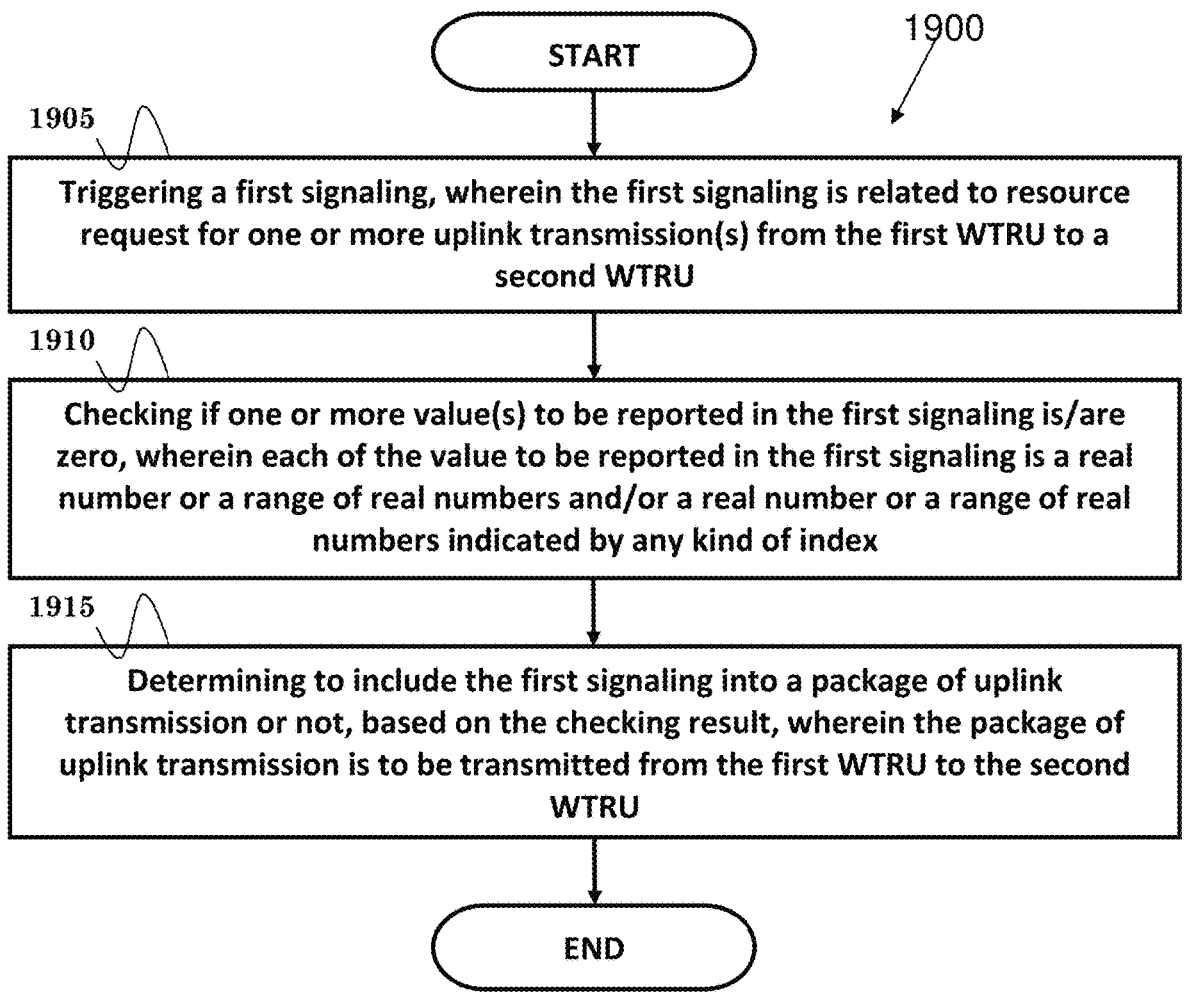
FIG. 19 is a flow chart according to one exemplary embodiment.

FIG. 19 is a flow chart 1900 according to one exemplary embodiment from the perspective of a first WTRU, wherein the first WTRU is capable of integrating access link and backhaul link. In step 1905, the first WTRU triggers a first signaling, wherein the first signaling is related to resource request for one or more uplink transmission(s) from the first WTRU to a second WTRU. In step 1910, the first WTRU checks if one or more value(s) to be reported in the first signaling is/are zero, wherein each of the value to be reported in the first signaling is referred to a real number or a range of real numbers and/or a real number or a range of real numbers indicated by any kind of index. In step 1915, the first WTRU determines to include the first signaling into a package of uplink transmission or not, based on the checking result, wherein the package of uplink transmission is to be transmitted from the first WTRU to the second WTRU.

In one embodiment, the first WTRU may not include the first signaling in the package of uplink transmission if the checking result is "all zero" (i.e. all value(s) to be reported in the first signaling is/are zero). Furthermore, the first WTRU may cancel the triggered first signaling (i.e.: the first signaling is no more triggered to be constructed for transmission).

In one embodiment, the first WTRU may include the first signaling in the package of uplink transmission if the checking result is "all zero" (i.e. all value(s) to be reported in the first signaling is/are zero). Furthermore, the first WTRU may cancel the triggered first signaling (i.e. the first signaling is no longer triggered to be constructed for transmission).

In one embodiment, the first WTRU may include the first signaling in the package of uplink transmission if the checking result is "not all zero" (i.e. not all value(s) to be reported in the first signaling is/are zero). Furthermore, the first WTRU may cancel the triggered first signaling (i.e.: the first signaling is no longer triggered to be constructed for transmission).

In one embodiment, the first WTRU may not include the first signaling into the package of uplink transmission if the checking result is "not all zero" (i.e. all value(s) to be reported in the first signaling is/are zero). Furthermore, the first WTRU does not cancel the triggered first signaling (i.e. the first signaling is still triggered to be constructed for transmission).

In one embodiment, the first WTRU may include the first signaling into the package of uplink transmission if the checking result is "not all zero" (i.e. not all value(s) to be reported in the first signaling is/are zero). Furthermore, the first WTRU does not cancelling the triggered first signaling (i.e. the first signaling is still triggered to be constructed for transmission).

In one embodiment, the first WTRU may not including the first signaling into the package of uplink transmission if the checking result is "not all zero" (i.e. all value(s) to be reported in the first signaling is/are zero). Furthermore, the first WTRU may cancel the triggered first signaling (i.e. the first signaling is no more triggered to be constructed for transmission).

In one embodiment, the first WTRU could be an IAB-node, and the second WTRU could be an IAB-node or an IAB-donor, or a gNB, or part of a gNB. The first signaling could be a buffer status report (BSR) (e.g. IAB Regular BSR) or a scheduling request (SR). The package of uplink transmission could be a MAC PDU (Protocol Data Unit).

In one embodiment, the one or more uplink transmission(s) from the first WTRU to the second WTRU could be related to the uplink resource allocation by the second WTRU based on the reception of the first signaling. The value(s) to be reported in the first signaling could be related to the volume of uplink traffic to be included into the package of uplink transmission. The value(s) to be reported in the first signaling could be related to uplink traffic currently available for transmission and/or uplink traffic expected to be (i.e. not currently) available for transmission. The value(s) to be reported in the first signaling for uplink traffic currently available for transmission and the values(s) to be reported in the first signaling for uplink traffic expected to be available for transmission could be separately handled.

Referring back to FIGS. 3 and 4, in one exemplary embodiment of a first WTRU, the device 300 includes a program code 312 stored in the memory 310. The CPU 308 could execute program code 312 to enable the first WTRU (i) to trigger a first signaling, wherein the first signaling is related to resource request for one or more uplink transmission(s) from the first WTRU to a second WTRU, (ii) to check if one or more value(s) to be reported in the first signaling is/are zero, wherein each of the value to be reported in the first signaling is a real number or a range of real numbers and/or a real number or a range of real numbers indicated by any kind of index, and (iii) to determine to include the first signaling into a package of uplink transmission or not, based on the checking result, wherein the package of uplink transmission is to be transmitted from the first WTRU to the second WTRU. Furthermore, the CPU 308 can execute the program code 312 to perform all of the above-described actions and steps or others described herein.

Various aspects of the disclosure have been described above. It should be apparent that the teachings herein could be embodied in a wide variety of forms and that any specific structure, function, or both being disclosed herein is merely representative. Based on the teachings herein one skilled in the art should appreciate that an aspect disclosed herein could be implemented independently of any other aspects and that two or more of these aspects could be combined in various ways. For example, an apparatus could be implemented or a method could be practiced using any number of the aspects set forth herein. In addition, such an apparatus could be implemented or such a method could be practiced using other structure, functionality, or structure and functionality in addition to or other than one or more of the aspects set forth herein. As an example of some of the above concepts, in some aspects concurrent channels could be established based on pulse repetition frequencies. In some aspects concurrent channels could be established based on pulse position or offsets. In some aspects concurrent channels could be established based on time hopping sequences. In some aspects concurrent channels could be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for a first wireless transmit/receive unit (WTRU), comprising:
   receiving a second buffer status report (BSR) from a second WTRU, wherein the second WTRU is a child node of the first WTRU;
   triggering a first BSR due to reception of the second BSR, wherein the first BSR indicates an estimated amount of data expected to arrive but not data already available for uplink transmission,
   wherein the first WTRU derives the estimated amount of data expected to arrive based on the second BSR without taking into account data received from the second WTRU after the reception of the second BSR; and
   transmitting the first BSR to a third WTRU, wherein the third WTRU is a parent node of the first WTRU.

2. The method of claim 1, wherein the estimated amount of data expected to arrive indicated by the first BSR includes data expected to arrive from the second WTRU.

3. The method of claim 2, wherein user plane data and control plane signaling is considered in the estimated amount of data expected to arrive from the second WTRU.

4. The method of claim 2, wherein the data expected to arrive from the second WTRU is data that has not been received from the second WTRU.

5. The method of claim 1, wherein the first BSR is a BSR for Integrated Access and Backhaul (IAB), which has the same characteristics as an ordinary Regular BSR, including triggering Scheduling Request (SR) and re-triggering itself.

6. The method of claim 1, wherein the estimated amount of data expected to arrive is for a logical channel group.

7. The method of claim 1, wherein the first BSR and/or the second BSR is reported in BSR Medium Access Control (MAC) Control Element (CE).

8. The method of claim 1, wherein the first WTRU is an Integrated access and backhaul-node (IAB-node), the second WTRU is an IAB-node or a User Equipment (UE), and the third WTRU is an IAB-node or an IAB-donor.

9. A first wireless transmit/receive unit (WTRU), comprising:
   a processor; and
   a memory operatively coupled to the processor, wherein the processor is configured to execute a program code to:
      receive a second buffer status report (BSR) from a second WTRU, wherein the second WTRU is a child node of the first WTRU;
      trigger a first BSR due to the reception of the second BSR, wherein the first BSR indicates an estimated amount of data expected to arrive but not data already available for uplink transmission,
      wherein the first WTRU derives the estimated amount of data expected to arrive based on the second BSR without taking into account data received from the second WTRU after the reception of the second BSR; and
      transmit the first BSR to a third WTRU, wherein the third WTRU is a parent node of the first WTRU.

10. The first WTRU of claim 9, wherein the estimated amount of data expected to arrive indicated by the first BSR includes data expected to arrive from the second WTRU.

11. The first WTRU of claim 10, wherein user plane data and control plane signaling is considered in the estimated amount of data expected to arrive from the second WTRU.

12. The first WTRU of claim 10, wherein the data expected to arrive from the second WTRU is the data that has not been received from the second WTRU.

13. The first WTRU of claim 9, wherein the first BSR is a BSR for Integrated Access and Backhaul (IAB), which has same characteristics as an ordinary Regular BSR, including triggering Scheduling Request (SR) and re-triggering itself.

14. The first WTRU of claim 9, wherein the estimated amount of data expected to arrive is for a logical channel group.

15. The first WTRU of claim 9, wherein the first BSR and/or the second BSR is reported in BSR Medium Access Control (MAC) Control Element (CE).

16. The first WTRU of claim 9, wherein the first WTRU is an Integrated access and backhaul-node (IAB-node), the second WTRU is an IAB-node or a User Equipment (UE), and the third WTRU is an IAB-node or an IAB-donor.

* * * * *